(12) United States Patent
Condeixa et al.

(10) Patent No.: US 10,298,691 B2
(45) Date of Patent: May 21, 2019

(54) SYSTEMS AND METHODS FOR MANAGING THE STORAGE AND DROPPING OF DATA IN A NETWORK OF MOVING THINGS

(71) Applicant: Veniam, Inc., Mountain View, CA (US)

(72) Inventors: Tiago Silvestre Condeixa, Aveiro (PT); Ricardo Jorge Magalhães de Matos, Oporto (PT)

(73) Assignee: Veniam, Inc., Mountain View, CA (US)

( * ) Notice: Subject to any disclaimer, the term of this patent is extended or adjusted under 35 U.S.C. 154(b) by 61 days.

(21) Appl. No.: 15/499,658

(22) Filed: Apr. 27, 2017

(65) Prior Publication Data

US 2017/0339011 A1     Nov. 23, 2017

Related U.S. Application Data

(60) Provisional application No. 62/338,157, filed on May 18, 2016.

(51) Int. Cl.
*H04L 29/08* (2006.01)
*H04W 4/70* (2018.01)

(52) U.S. Cl.
CPC ........... *H04L 67/1097* (2013.01); *H04W 4/70* (2018.02)

(58) Field of Classification Search
None
See application file for complete search history.

(56) References Cited

U.S. PATENT DOCUMENTS

| | | | |
|---|---|---|---|
| 7,206,861 B1 | 4/2007 | Callon | |
| 7,606,370 B2 | 10/2009 | Lillie et al. | |
| 8,117,303 B2 | 2/2012 | Fonsen | |
| 8,443,063 B1 | 5/2013 | Nelson et al. | |
| 8,570,962 B2 | 10/2013 | Gage | |
| 9,271,261 B1 | 2/2016 | Mauer et al. | |
| 9,852,076 B1* | 12/2017 | Garg | G06F 17/30132 |
| 10,057,742 B2 | 8/2018 | Condeixa et al. | |
| 2003/0206554 A1* | 11/2003 | Dillon | G06F 17/30017 370/432 |
| 2005/0114895 A1* | 5/2005 | Ismail | H04L 29/06 725/81 |

(Continued)

FOREIGN PATENT DOCUMENTS

WO     2012128792     9/2012

OTHER PUBLICATIONS

Int'l Search Report and Written Opinion for PCT/US17/32860 dated Jun. 9, 2017 (14 pages).

(Continued)

*Primary Examiner* — Christine T Duong

(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide communication network architectures, systems, and methods for supporting a dynamically configurable communication network comprising a complex array of both static and moving communication nodes (e.g., the Internet of moving things). More specifically, systems and methods for managing the storage and dropping of data in a network of moving things.

18 Claims, 18 Drawing Sheets

(56) References Cited

U.S. PATENT DOCUMENTS

| | | |
|---|---|---|
| 2005/0221759 A1 | 10/2005 | Spadafora et al. |
| 2006/0221759 A1 | 10/2006 | Smith et al. |
| 2006/0265333 A1 | 11/2006 | Gomes et al. |
| 2007/0097877 A1 | 5/2007 | Hoekstra et al. |
| 2007/0214046 A1 | 9/2007 | Falchuk et al. |
| 2008/0046978 A1 | 2/2008 | Rieger |
| 2008/0222154 A1 | 9/2008 | Harrington et al. |
| 2009/0100128 A1 | 4/2009 | Czechowski, III |
| 2009/0129316 A1 | 5/2009 | Ramanathan et al. |
| 2009/0182815 A1 | 7/2009 | Czechowski, III |
| 2010/0076670 A1 | 3/2010 | Turner et al. |
| 2011/0055326 A1 | 3/2011 | Michaelis et al. |
| 2011/0238751 A1 | 9/2011 | Belimpasakis et al. |
| 2011/0310813 A1 | 12/2011 | Gage |
| 2012/0258727 A1 | 10/2012 | Wong et al. |
| 2012/0309425 A1 | 12/2012 | El Khayat et al. |
| 2013/0211870 A1 | 8/2013 | Lawson et al. |
| 2015/0163691 A1 | 6/2015 | Levi et al. |
| 2015/0264554 A1 | 9/2015 | Addepalli et al. |
| 2015/0350031 A1 | 12/2015 | Burks et al. |
| 2016/0105356 A1 | 4/2016 | Dowdell et al. |
| 2016/0105523 A1 | 4/2016 | Dowdell |
| 2016/0316499 A1 | 10/2016 | Ahmed |
| 2016/0330675 A1 | 11/2016 | Reitsma et al. |
| 2016/0366559 A1 | 12/2016 | King et al. |
| 2017/0149882 A1 | 5/2017 | Roy |
| 2017/0272361 A1 | 9/2017 | Speight |
| 2017/0332259 A1 | 11/2017 | Hirayama et al. |
| 2017/0339224 A1 | 11/2017 | Condeixa et al. |
| 2017/0339510 A1 | 11/2017 | Condeixa et al. |
| 2017/0339622 A1 | 11/2017 | Condeixa et al. |
| 2017/0373979 A1 | 12/2017 | Speight |
| 2018/0091966 A1 | 3/2018 | Cooper |

OTHER PUBLICATIONS

Int'l Search Report and Written Opinion for PCT/US2017/032864 dated Jul. 26, 2017 (16 pages).

Whitbeck et al. "Relieving the Wireless Infrastructure: When Opportunistic Networks Meet Guaranteed Delays". May 30, 2011. IEEE. pp. 1-9. (Year: 2011).

Chattopadhyay et al. "Location Aware Opportunistic Bandwidth Sharing between Static and Mobile Users with Stochastic Learning in Cellular Networks". Aug. 15, 2016. pp. 1-16. (Year: 2016).

Helgason, Olafur Ragnar. "Opportunistic Content Distribution". 2011. pp. 1-128. (Year: 2011).

Al-Fagih et al., "Routing Schemes for Delay-Tolerant Networks—An Applications Perspective". 2012. pp. 1-42. (Year: 2012).

Hadiwardoyo et al. "Deploying Public Surface Transit to Forward Messages in DTN". Aug. 2015. IEEE. pp. 1-8. (Year: 2015).

* cited by examiner

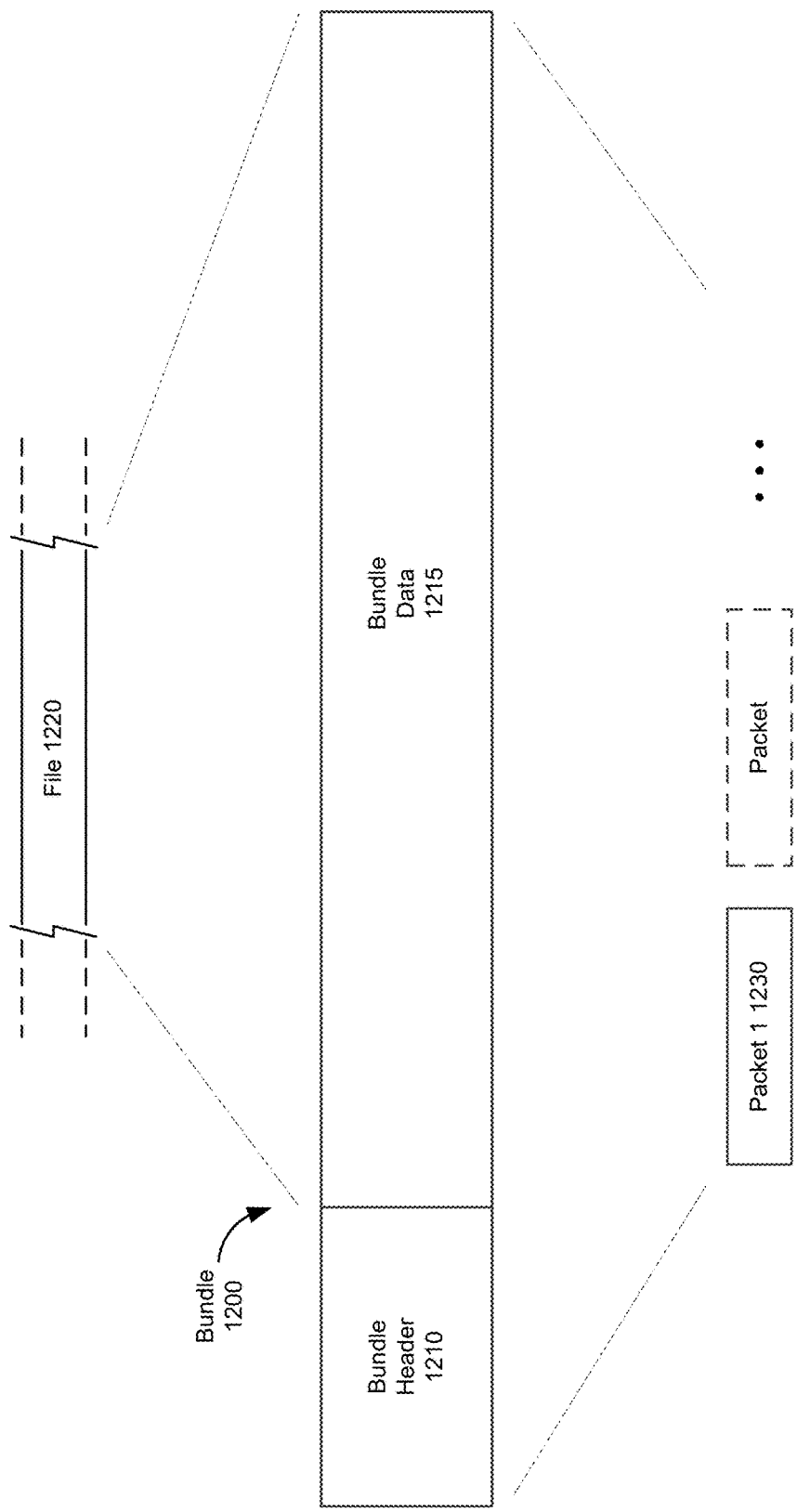

SYSTEMS AND METHODS FOR MANAGING THE STORAGE AND DROPPING OF DATA IN A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Patent Application Ser. No. 62/338,157, filed on May 18, 2016, and titled "Systems and Methods for Managing the Storage and Dropping of Data in a Network of Moving Things," which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; U.S. Provisional Application Ser. No. 62/257,421, titled "Systems and Methods for Delay Tolerant Networking in a Network of Moving Things," filed Nov. 19, 2015; U.S. Provisional Application Ser. No. 62/299,269, titled "Systems and Methods for Automating and Easing the Installation and Setup of the Infrastructure Supporting a Network of Moving Things," filed on Feb. 24, 2016; U.S. Provisional Application Ser. No. 62/338,135, titled "Systems and Methods for Managing the Routing and Replication of Data in the Upload Direction in a Network of Moving Things," filed on May 18, 2016; U.S. Provisional Application Ser. No. 62/338,151, titled "Systems and Methods for Managing the Scheduling and Prioritizing of Data in a Network of Moving Things," filed on May 18, 2016; and U.S. Provisional Application Ser. No. 62/338,157, titled "Systems and Methods for Managing the Storage and Dropping of Data in a Network of Moving Things," filed on May 18, 2016, each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

BRIEF DESCRIPTION OF SEVERAL VIEWS OF THE DRAWINGS

FIG. 12 is an illustration of an example bundle of data comprising a portion referred to herein as a bundle header and a portion referred to herein as bundle data, in accordance with various aspects of the present disclosure.

SUMMARY

Figure 1:
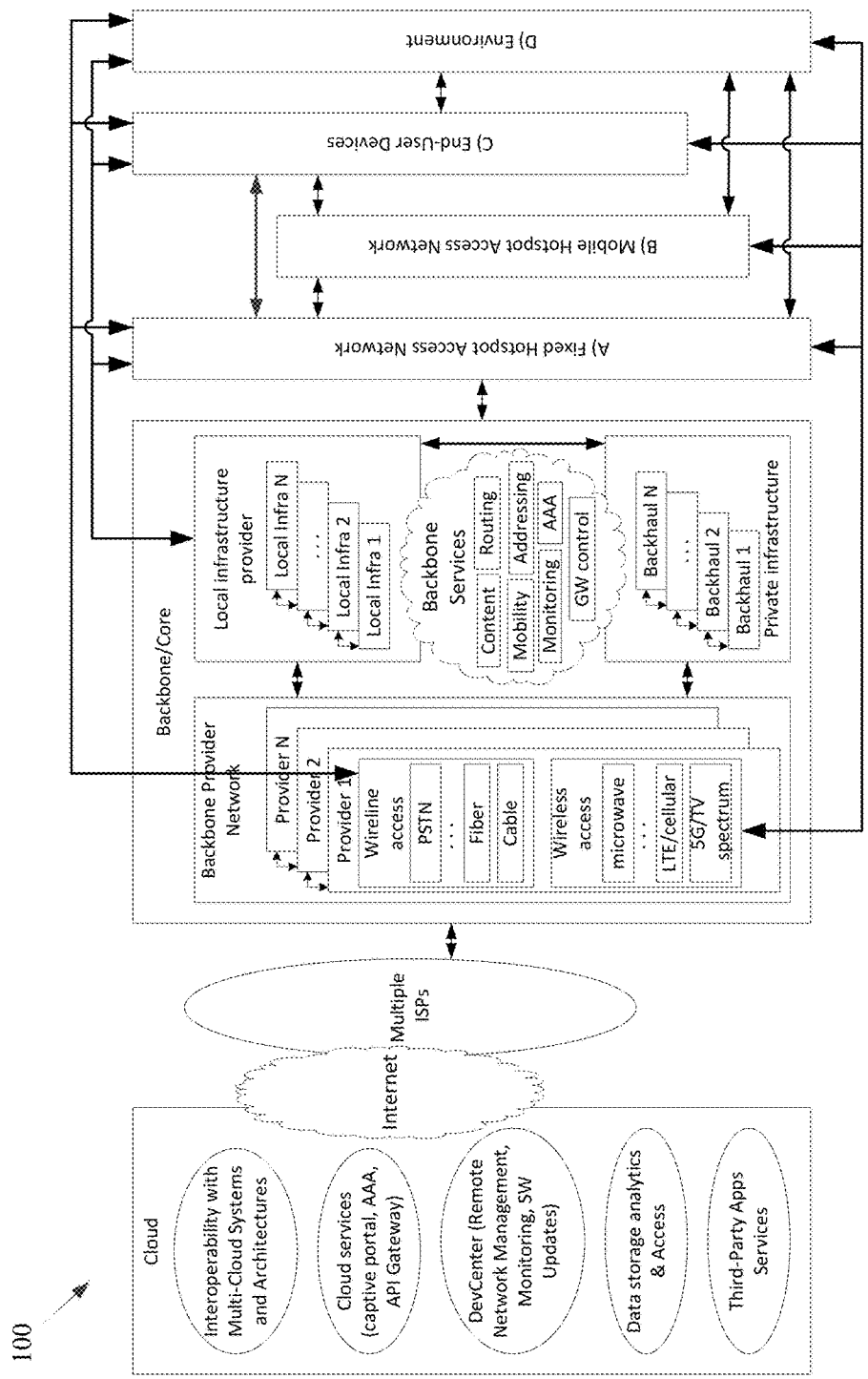
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set $\{(x), (y), (x, y)\}$. That is, "x and/or y" means "one or both of x and y." As another example, "x, y, and/or z" means any element of the seven-element set $\{(x), (y), (z), (x, y), (x, z), (y, z), (x, y, z)\}$. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising,"

"including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
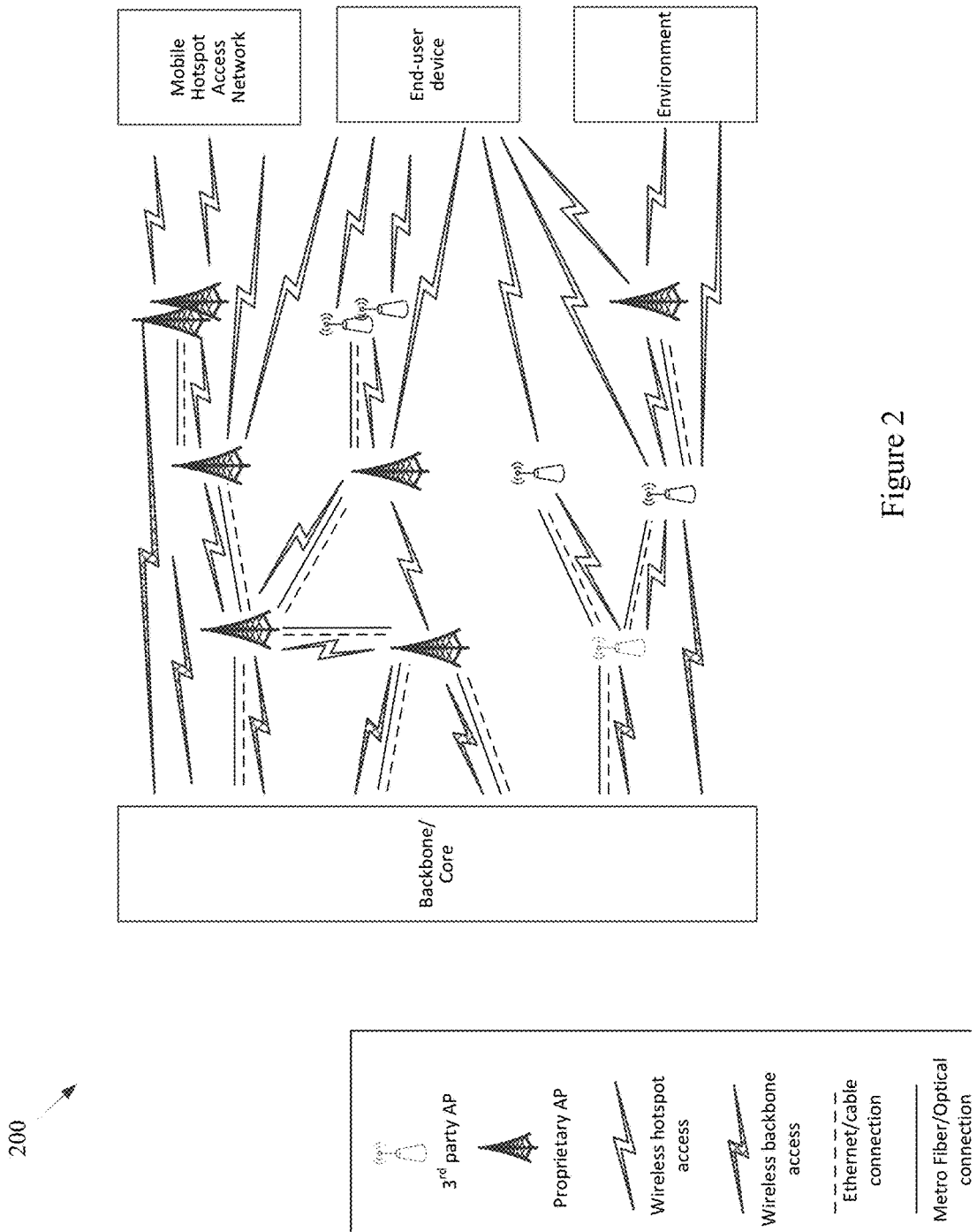
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
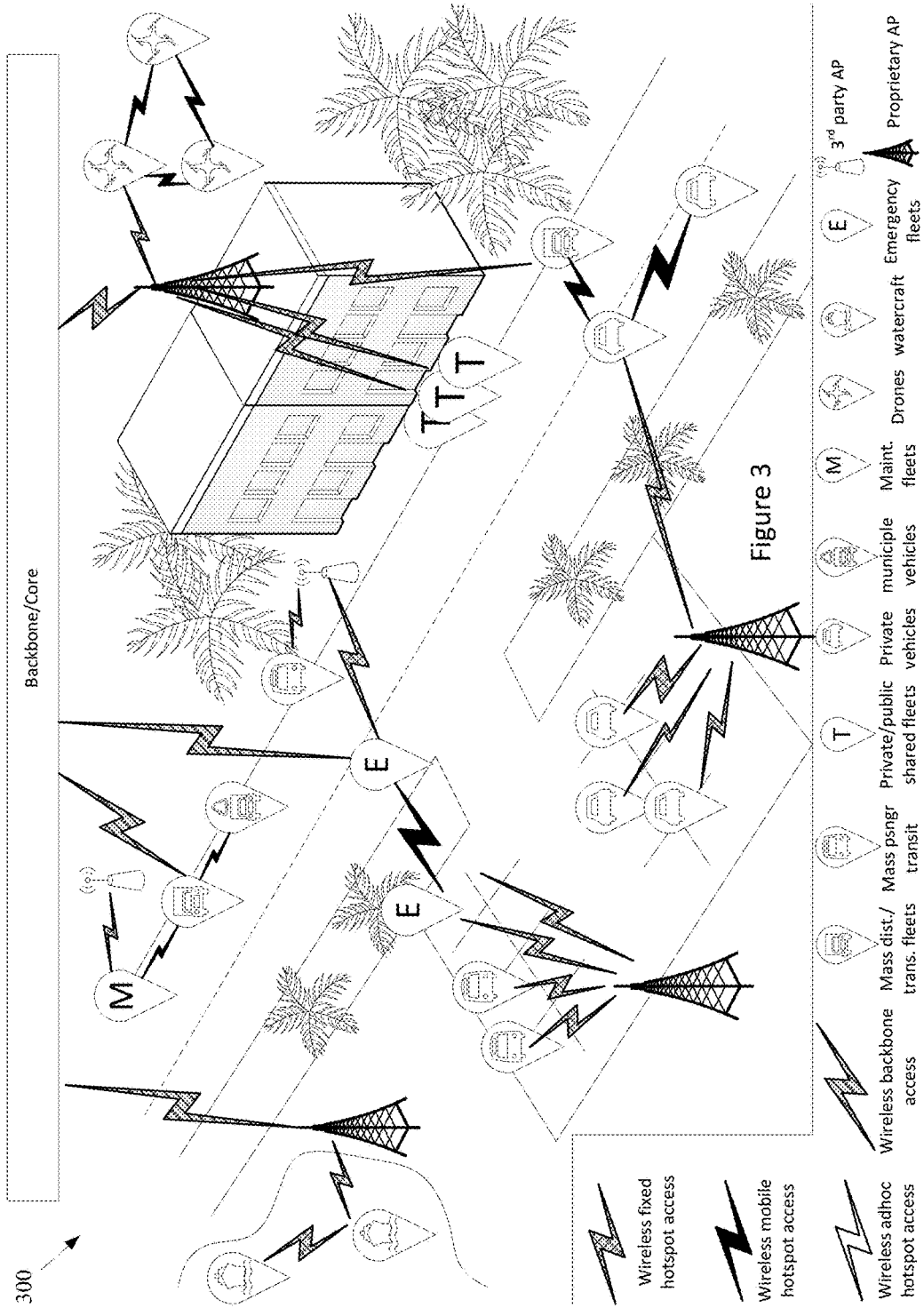
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, and 600 discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
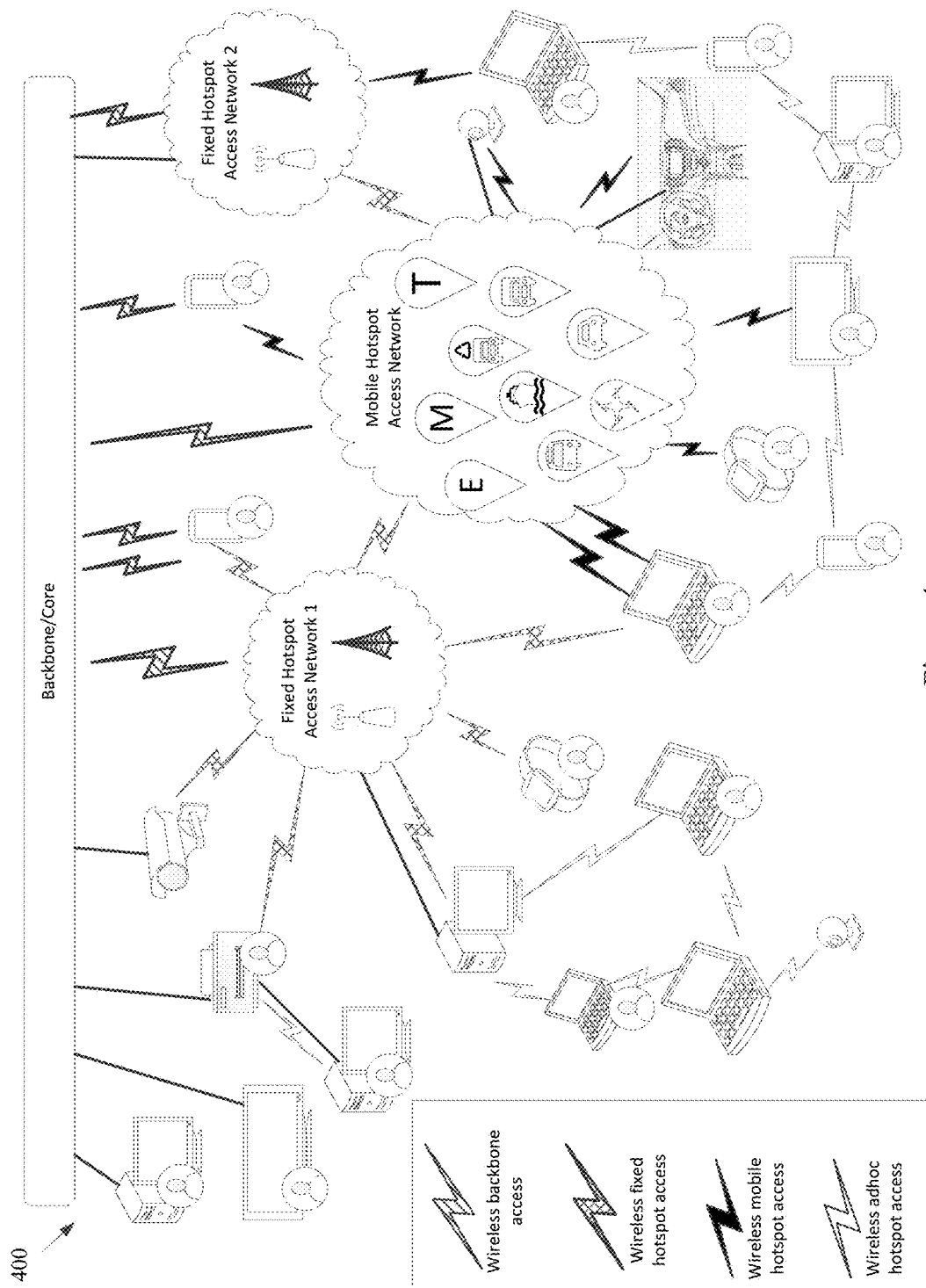
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
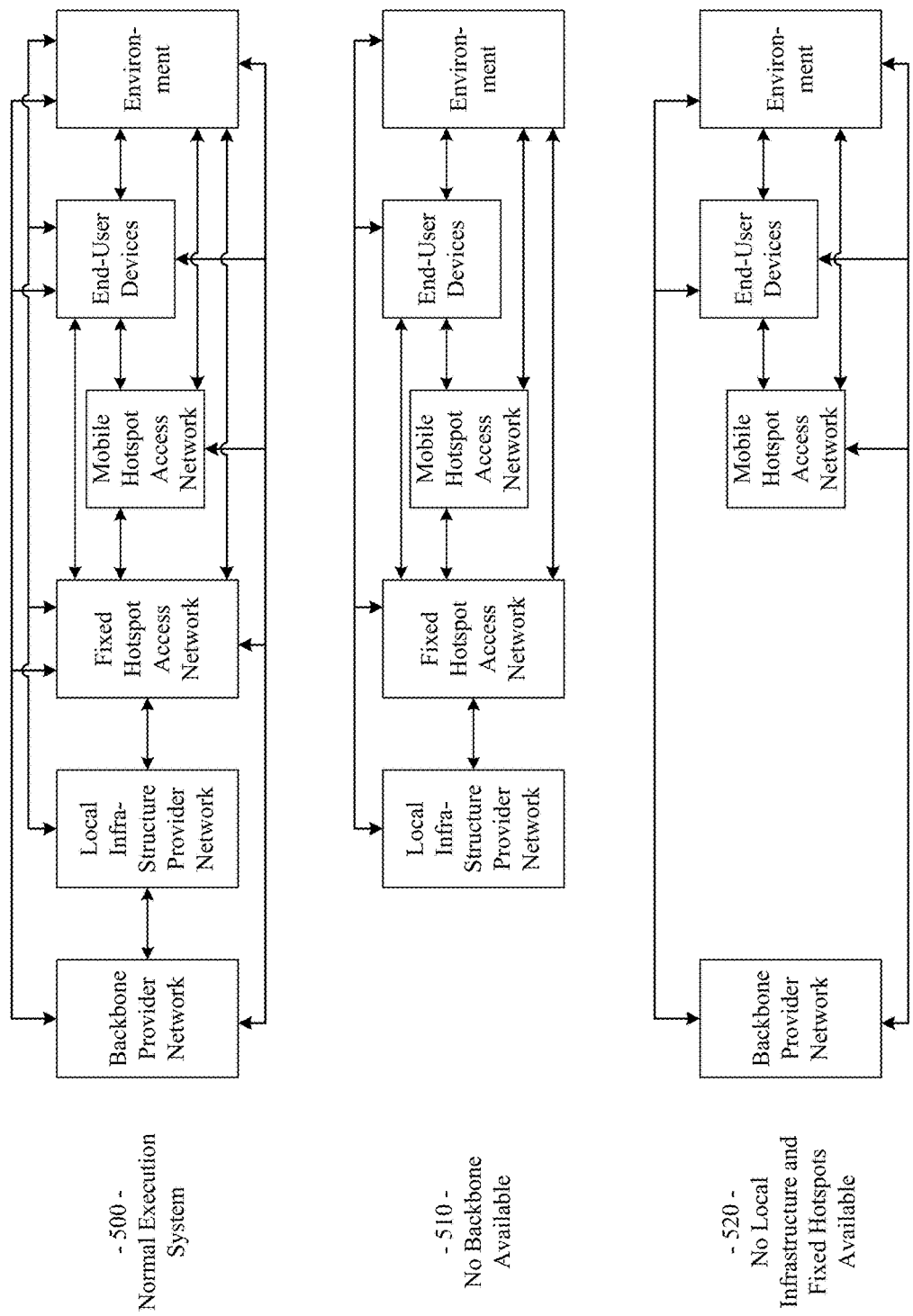
FIGS. 5A-5C show a plurality of network configurations illustrating the flexibility and/or and resiliency of a communication network, in accordance with various aspects of this disclosure.
Figure 5B:
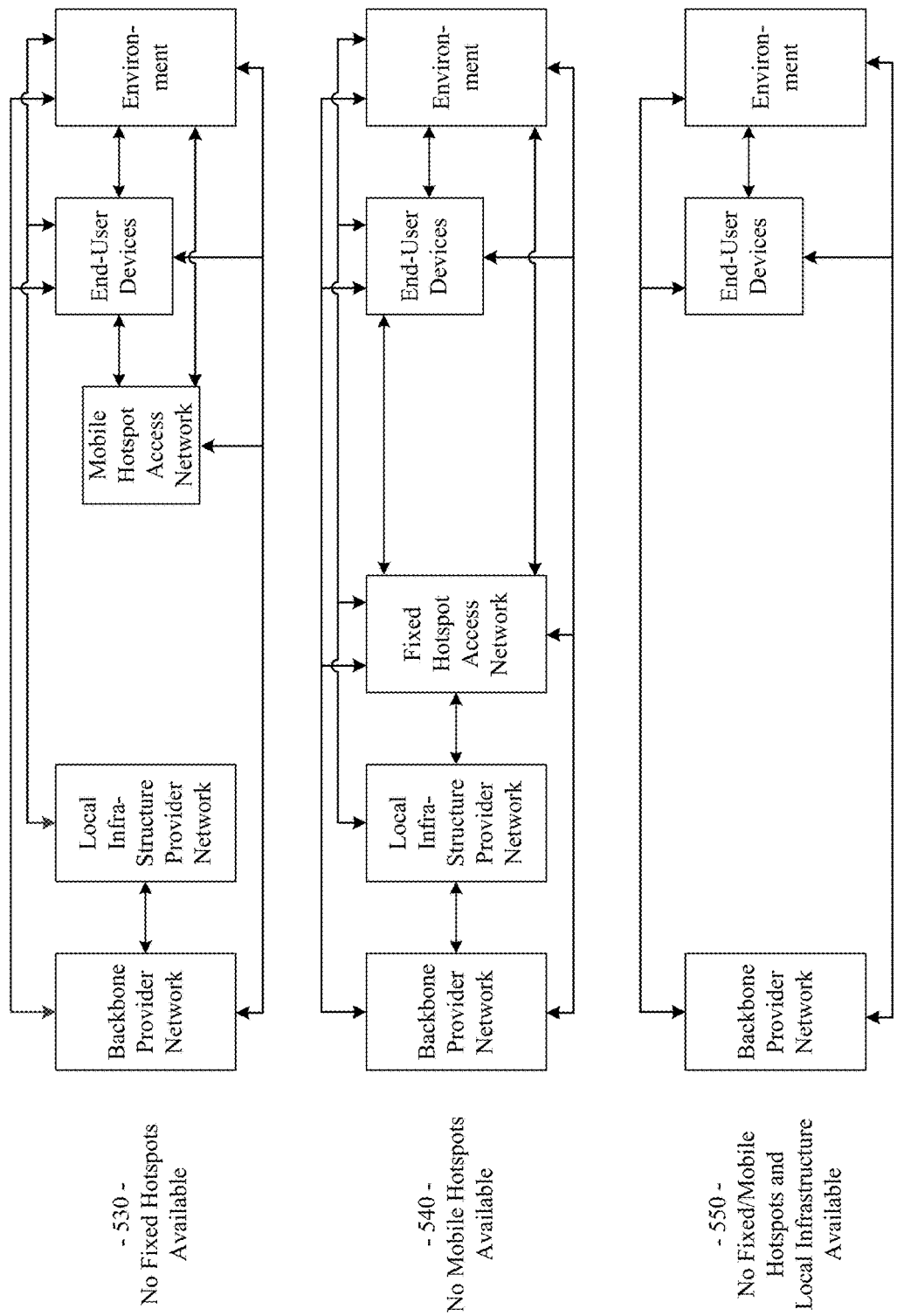
Figure 5C:
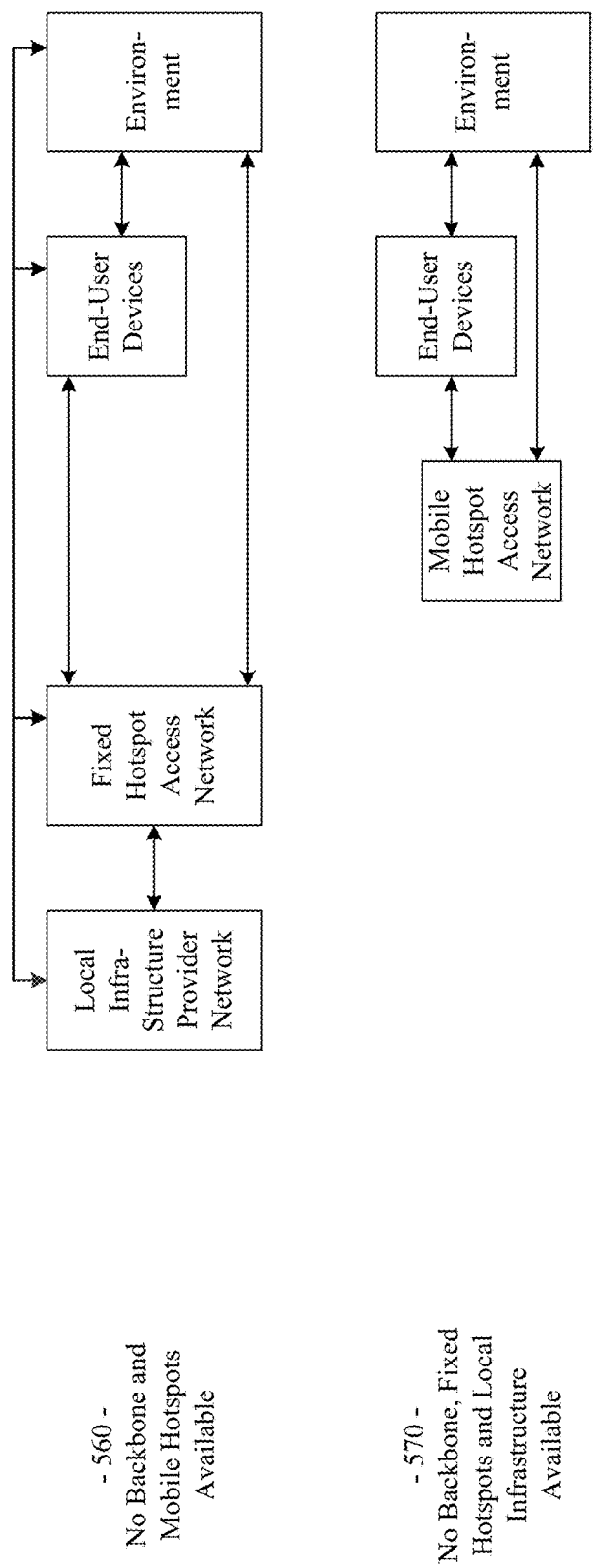

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
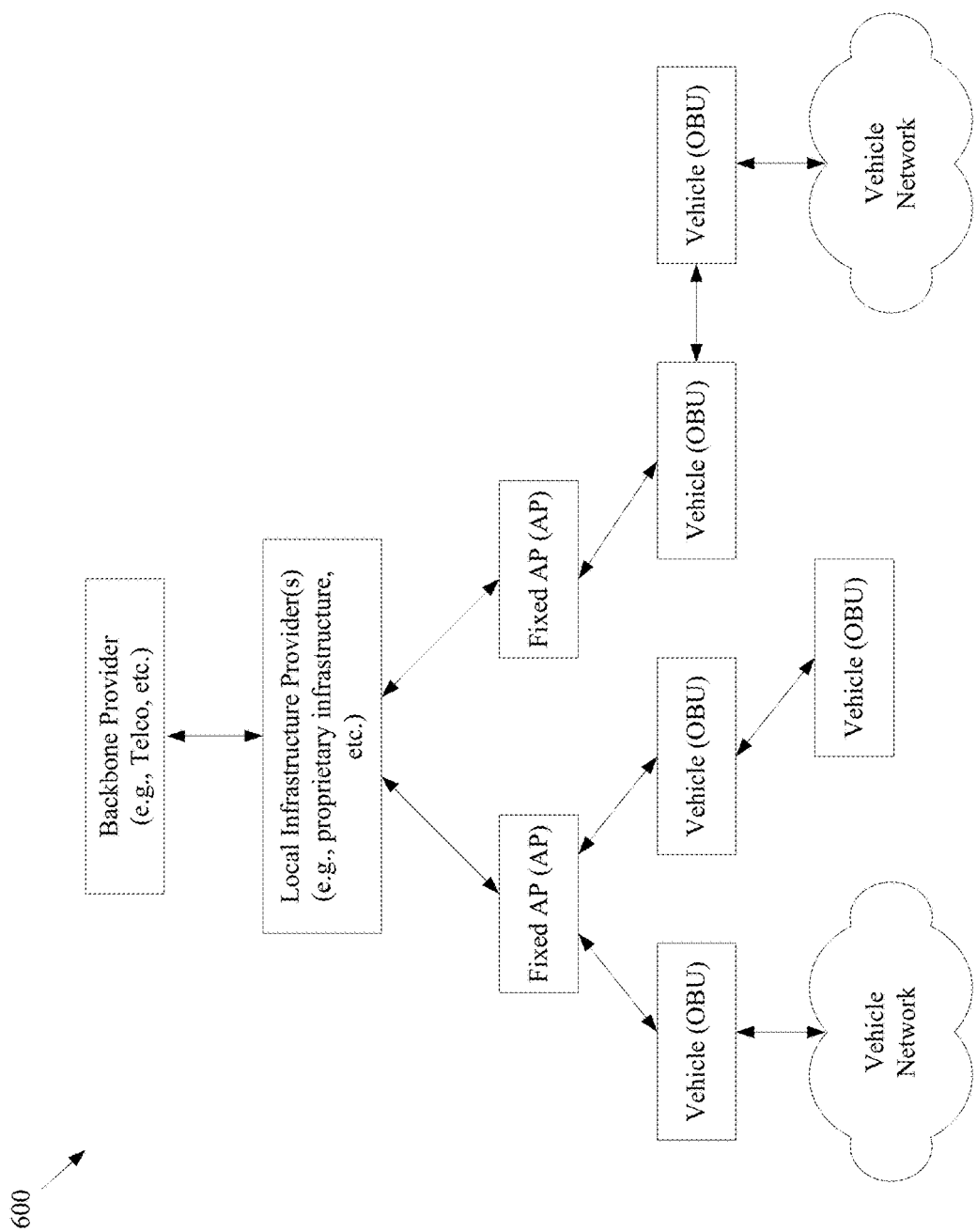
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

There is an ever growing amount of data generated throughout the huge variety of connected devices in the network of moving things. Aspects of this disclosure provide for cost-effective retention and dissemination of such data through the vehicular network infrastructure, while meeting the QoS needs of the applications/services that use such data. Such applications/services may be located in the Cloud, may be provided by network nodes (e.g., mobile or fixed access points (MAPs or FAPs), or may be run by the end-user devices connected to the APs. As used herein, "data retention and dissemination rules" may be used to govern where (i.e., in which network nodes and/or which storage devices of which network nodes), when (i.e., at what times and/or for how long), and/or how (i.e., in what format or form of organization (e.g., compressed, non-compressed, structured as "objects", unstructured files, etc.), via which type(s) of network communication link(s) (e.g., Wi-Fi (e.g., IEEE 802.11a/b/g/n/ac/ad/ad), cellular (e.g., 3G, 4G, LTE, GSM, CDMA, etc.)) data is: routed, stored, dropped, replicated, shared, prioritized, scheduled, and/or the like, in the upstream and/or downstream directions. As used herein, the term "bundle" may be used to refer to a block/package/unit of data (e.g., comprising one or more fragments of data from one or more files from one or more sources) sent between a first network node and a second network node. A bundle may comprise a single packet (e.g., an IP packet) or may be a set of such packets that belong to the same piece of data. It should be noted that while the length of a packet may, for example, be defined in terms of a Maximum Transfer Unit (MTU) number of bytes (e.g., 1500 bytes in some networks), a bundle may be made up of one or more packets, depending upon the amount of data to be transferred from the sending network node to a receiving network node. In accordance with various aspects of the present disclosure, a bundle may be split at the sending node and aggregated again at the receiving node.

The highly mobile and constantly changing nature of mobile APs can make it difficult to communicate large amounts of data to and from the mobile APs in a timely and cost-efficient manner. Accordingly, various aspects of this disclosure enable taking advantage of the intermittent contacts that may occur among mobile APs and between mobile APs and fixed APs, in order to reduce the cost of storing and transferring the data. By taking advantage of aspects of this disclosure, the data can be better balanced among mobile APs, thus reducing the amount of storage capacity required of the mobile APs, while still meeting latency/QoS requirements of the end-users of the data and reducing reliance on expensive (e.g., cellular) data connections. For example, a mobile AP that does not frequently connect to any fixed APs may be forced to resort to, for example, a cellular data connection to enable the mobile AP to reach a resource or system located in, for example, the Cloud/Internet. Aspects of the present disclosure, however, enable such mobile APs to communicatively couple to other mobile AP(s) that more-frequently connect to one or more fixed AP(s), thus enabling those APs to reach the Internet/Cloud without having to resort to a more costly (e.g., cellular) data connection.

Aspects of this disclosure provide various methods and systems that may be used to optimize (e.g., in terms of overhead such as cellular network usage, amount of network congestion introduced, number of data connections established, etc.) the flow of data between mobile APs both in the upstream and downstream directions.

In an example implementation, a sending node of a network as described herein (e.g., a mobile AP) may broadcast a bundle to be received by one or more neighboring nodes of the network (e.g., MAPs and/or FAPs within wireless communication range of the sending MAP). Each of those neighboring nodes may then decide, based upon context information available to the respective neighboring node, whether or not to store the received bundle, and whether or not to acknowledge the receipt of the bundle to the sending node.

In accordance with aspects of the present disclosure, the sending mobile AP may decide, based on context information available to the sending MAP, whether or not to replicate a bundle to one or more of its neighboring nodes using, for example, unicast messages (addressed to a single receiver), and if so, whether or not to wait for acknowledgement of the unicast message by the neighboring node. In accordance with various aspects of the present disclosure, replication of a bundle of data may produce one or more identical copies of the original bundle of data. Thus, in such an implementation, the decision/knowledge regarding how to handle the bundle is centralized at the sender.

In a network according to aspects of the present disclosure, one or more nodes of the network (e.g., devices such as mobile APs, fixed APs, Delay Tolerant Network/Disruption Tolerant Network (DTN) servers, etc.) may advertise information about one or more bundles that the one or more network nodes are currently storing (e.g., by sending unicast, multicast, and/or broadcast messages into the network). Such advertised information may include, for example, the type of data in the bundle(s), the size of the bundle(s), whether the network node is trying to send the bundle(s), the destination of the bundle(s), etc. Other network nodes receiving such advertisements may then use context information available to the other network nodes to decide whether the other network nodes want/need the bundle(s), and/or whether the other network nodes can accept receipt of the bundle(s) for subsequently forwarding to yet another network node.

In accordance with various aspects of the present disclosure, one or more nodes of the network (e.g., devices such as mobile APs, fixed APs, DTN servers, etc.) may advertise information about one or more bundle(s) that they are currently in need of or want to receive (e.g., by sending unicast, multicast, and/or broadcast messages into the network). Other network nodes receiving such advertisements may then use context information available to the other nodes to decide whether they are in possession of the wanted/desired bundle(s), and, if so, whether the other nodes can and/or should agree to deliver the bundles to the node advertising the need/want.

In a network according to aspects of the present disclosure, network nodes (e.g., mobile APs or other devices) may establish what may be referred to herein as a "control channel" with one or more fixed APs and/or the Cloud, in order to gather context information that may be used in selecting and implementing data dissemination and retention rules.

In a network as described herein, for communication in the "upstream" direction (i.e., in which the Internet/Cloud is the end destination), many or all of the nodes of the network may attempt to send data to the same destination (e.g., DTN server), whereas communication in the "downstream" direction (i.e., from the Internet/Cloud to the APs) may involve the use of "flooding" mechanisms to distribute data to the nodes of the network. Accordingly, in such a network, a first set of one or more data dissemination and retention rules may be used for the "upstream" communication, and a second, possibly different, set of one or more data dissemination and retention rules may be used for "downstream" communications. Such data dissemination and retention rules may be a part of configuration information distributed to the nodes of a network according to the present disclosure. Additional information about the distribution of such configuration information may be found, for example, in U.S. patent application Ser. No. 15/138,370, titled "Systems and Methods for Remote Configuration Update and Distribution in a Network of Moving Things," filed Apr. 26, 2016, the complete subject matter of which is hereby incorporated herein, in its entirety.

In a network according to various aspects of the present disclosure, the context information used by a particular network node at any particular time may comprise, by way of example and not limitation, characteristics of the particular node (e.g., the network or geographic location, speed, direction, path of travel, uptime, hardware configuration, software configuration, and/or the like); characteristics of data to be sent or received by the particular node (e.g., the size, QoS requirements, and/or the like) that may include, for example, bundle context information. In accordance with aspects of the present disclosure, bundle context information may comprise, for example, a priority of one or more bundles of data, an age in the network of one or more bundles of data, an amount of time to live of one or more bundles of data, and/or a total number of copies of each specific bundle of one or more bundles of data currently residing within nodes of the network, to name just a few examples. Context information may also comprise characteristics of any wireless link(s) available for communicating the data (e.g., maximum available bandwidth, currently available bandwidth, amount of congestion, error rate, etc.). The context information used by the particular network node may also comprise, for example, characteristics of neighbor device(s) such as, for example, the speed, direction, and/or path of travel of each neighbor; the type and/or amount of data storage available on each neighbor; an operator of each neighbor; and/or the like, where the neighbor(s) may comprise one or more mobile APs, fixed APs, cellular base stations, and/or end-user devices. In addition, the context information used by the particular network node may comprise, by way of example and not limitation, characteristics of the environment of the particular network node such as, for example, a number/density of nodes present within a determined region or area surrounding the network node; an amount of wireless interference or activity present in an area around the network node; the presence/size/location/etc. of physical obstructions that may affect the particular network node (e.g., whether line-of-sight vs. non-line-of-sight communication is possible); and/or an expected time until being in-range of a fixed AP, and/or the like).

In accordance with various aspects of the present disclosure, such context information may be provided by, for example, devices in the Internet/Cloud, mobile APs of the vehicular network, fixed APs of the vehicular network, sensors of the vehicular network, and/or end-user devices of the vehicular network. For example, one or more of these network nodes and/or devices may probe the network and may provide context information in real time.

As a few, non-limiting examples, context information used by a particular node for a particular bundle may comprise the number of replicas of the particular bundle that currently exist in the network; a probability that the particular node can wirelessly communicate with a particular neighbor node (e.g., without using a cellular connection); a probability that the particular node can communicate with any neighbor node; and/or a probability that the particular node will be at or in proximity to a particular geographic location within some determined time interval (e.g., for nodes that are mobile). Context information used by the particular node for a particular bundle may also comprise, for example, a probability that the particular node will be able to wirelessly connect to a fixed AP (e.g., based on its current geographic location, historical information of the geographic location of the particular node, and/or the geographic location(s) of one or more fixed APs of the network). In addition, context information used by the particular node for a particular bundle may also comprise, for example amount of unused storage in the particular node; an amount of unused storage in one or more neighboring nodes; a number of missing fragments of a specific file that are needed in order to decode the entire file; a "time-to-live" for the particular bundle; a latency tolerance of the particular bundle; a number of hops the bundle has traversed and/or should traverse; and/or a past, present, and/or predicted future number of nodes that have been/are/will be neighbor nodes of the particular node. The term "time-to-live" may be used herein to refer to a maximum amount of time that a bundle is allowed to be in transit within the network before an action is taken to delete the bundle from each node of the network. In accordance with various aspects of the present disclosure, a bundle may, for example, contain a "date/time of creation" (e.g., 15:30 02/02/17 UTC) and a "time-to-live" (e.g., 3600 seconds or 60 minutes). In an alternate instance according to the present disclosure, each bundle may, for example, contain a "date-to-live" or "expiration date" (e.g., 16:30 02/02/17 UTC), which may define a date/time when the bundle is no longer valid. Such bundle expiration or "time-to-live" information may be defined when a bundle of data is created, and may remain the same throughout the lifetime of the bundle. Using such information, a network node (e.g., a mobile AP, fixed AP, NC, sensor, etc.) may calculate, using current date/time information from, for example, a GNSS/GPS receiver or a Network Time Protocol (NTP) server, whether the bundle is valid. In accordance with aspects of the present disclosure, a "time-to-live" or "date-to-live" may provide for a bundle life of, for example, up to 60 seconds, up to an hour, or as much as a day.

Various aspects of this disclosure enable prioritizing and/or scheduling communication and/or delivery of a bundle based on a "time-to-live" of the bundle, an indication of priority and/or importance of the bundle, an indication of latency sensitivity of the bundle, and/or other characteristics of the bundle. A network in accordance with aspects of the present disclosure includes methods and systems for scheduling bundles carrying real-time data that is to be communicated with highest priority.

Various aspects of the present disclosure provide methods and systems for dealing with a variety of characteristics of different types of storage systems which may be in use at the nodes (e.g., FAPs, MAPs, NCs, sensor(s)) of the network. By way of example and not limitation, the context information may include storage capacity, read/write speed, organization, etc. of storage devices and file systems from which the data will be read and/or to which the data will be stored. For example, some storage systems of a network node may comprise hard disk drives, and some may comprise solid state devices (e.g., FLASH-based or battery backed RAM). Some storage in network nodes may, for example, be organized as file-based storage, some may be organized as object-based storage, and some may use other types of organization/structure.

In accordance with various aspects of the present disclosure, data compression may be applied to a particular bundle at a particular time, and the algorithms for such data compression may be determined based on context information. For example, the data compression algorithm employed, the target compression ratio, and other aspects, may be determined based on the type of data contained in the bundle. By way of example and not limitation, the data contained in a bundle may be characterized by metadata such as a file extension that associates the data with a particular software application, by latency sensitivity of the bundle, by a "time-to-live" of the bundle, by a type of network connection over which the bundle is to be communicated, to name only a few characteristics that are contemplated.

In a network according to aspects of the present disclosure, context information may be used to determine which bundles a network node (e.g., FAPs, MAPs, NCs, etc.) is to drop/delete/overwrite in order to maintain a sufficient quality of service (QoS). Whether a particular network node stores or drops a particular bundle may depend upon, by way of example and not limitation, one or more indicators of the urgency, delay-sensitivity, loss-tolerance, and/or "time-to-live" of the bundle; an amount of bandwidth available on communication links to/from the network node currently handling the bundle, and/or an amount or type of storage available in the node handling the bundle. In addition, if a decision is made to store the particular bundle at the particular node (e.g., based on any of the context information discussed herein), the duration of time for which the particular bundle should be stored at the particular node may be determined based on any of the context information described herein.

A node of a network according to aspects of the present disclosure (e.g., a fixed AP, mobile AP, network controller) may, for example, be configured to predict the impact of various possible data dissemination and retention rules, to assess which rule(s) will be the best, or at least a suitable choice. Such a prediction may be based, for example, on context information advertised by the Cloud, by fixed APs, by mobile APs, by sensors, and/or by end-user devices. In accordance with some aspects of the disclosure, such predictions may be based on context information collected and/or derived from previous surveys and/or analyses performed in a network context similar to the context that a mobile AP is currently experiencing, or may be predicted to experience in the near term. Some example characteristics used in making such predictions may include, by way of example and not limitation, a network or geographic location, a measure of density of mobile APs, a measure of density of fixed APs, obstructions that may impact wireless communication, requirements set by the end-users of the data being communicated, to name just a few.

Methods and systems in accordance with aspects of this disclosure may use hysteresis and/or other techniques to reduce frequency of switching between different data retention and dissemination rules, so as to avoid oscillations that may occur between different rules, and to reduce any computational and/or resource costs of managing the data dissemination and retention rules. For example, switching to a different data retention and dissemination rule may involve arriving at a consensus of a defined set of nodes (e.g., one or more nodes in the same geographic region or same cluster).

Aspects of this disclosure enable gathering data from multiple and heterogeneous sources in a network of moving things, while taking into account the limited resources (e.g., CPU computing capacity, data storage capacity and types, operating power, etc.) of many of the nodes that are part of the network, to ensure that software applications that use the gathered data receive it in accordance with their QoS expectations. Aspects of this disclosure provide a network that is scalable, reliable, and that provides high-performance support for the gathering, transportation, dissemination, and sharing of information among different network elements, while ensuring selection of suitable trade-offs between the various requirements of all the software applications and services that make use of such data.

In a network as described herein, data storage/retention and dissemination rules may comprise various parameters which may be dynamically configured/adapted. Changing one or more such parameter values is referred to herein as changing the data storage/retention and dissemination rule or switching between different data storage and dissemination rules. As previously noted, a network in accordance with aspects of the present disclosure may have multiple sets of data storage/retention and dissemination rules for communication of data traffic in "upstream" and "downstream" directions. Some examples of such parameters include, but are not limited to, a maximum number of replicas (i.e., copies) that should be generated for a bundle at a network node, a maximum number of hops (i.e., communication paths or links) onto which to replicate a particular bundle, priorities of various data types, priorities of various senders of bundles, priorities of various recipients of bundles, whether or not a recipient of a bundle is to send an acknowledgement (ACK) of receipt of the bundle, and whether a node is to use broadcast, multicast, and/or unicast in communicating a bundle. Additional details regarding the handling of bundles in the "upstream" and "downstream" directions may, for example, be found, respectively, in U.S. patent application Ser. No. 15/456,441, titled "Systems and Methods for Managing the Routing and Replication of Data in the Upload Direction in a Network of Moving Things," filed on Mar. 10, 2017, and U.S. patent application Ser. No. 15/478,181, titled "Systems and Methods for Managing the Routing and Replication of Data in the Download Direction in a Network of Moving Things," filed on Apr. 3, 2017, the contents of each of which is hereby incorporated herein by reference, in its respective entirety.

Figure 7:
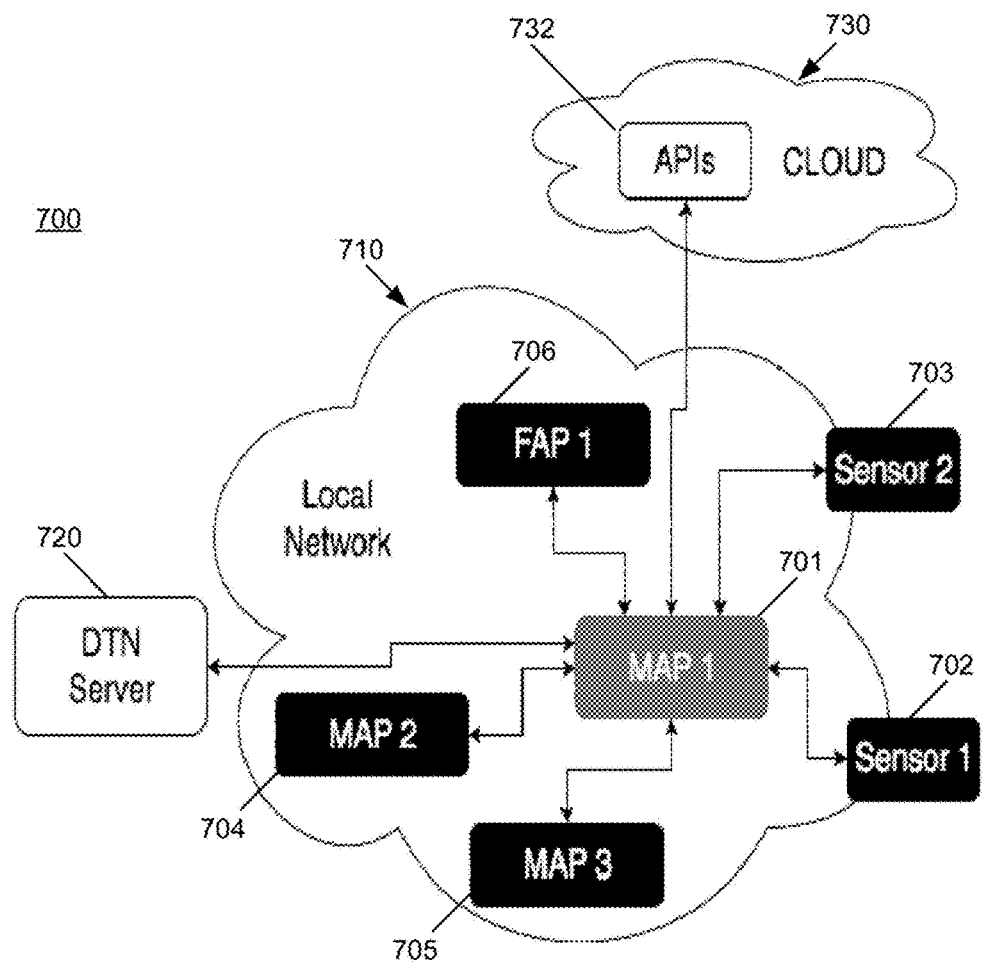
FIG. 7 shows a block diagram of an example mobile AP in a network of moving things, in accordance with various aspects of the present disclosure.

FIG. 7 shows a block diagram of an example mobile AP 701 in a network of moving things 710, in accordance with various aspects of the present disclosure. In the example shown in FIG. 7, the mobile AP MAP 1 701 is configured to communicate with a delay tolerant networking (DTN) server 720 and a set of application programming interfaces 732 of a Cloud 730, to implement data retention and dissemination rules as described herein. Functionality (e.g., circuitry, logic, and/or executable instructions) supporting delay tolerant networking in accordance with this disclosure may, for example, be integrated into one or more APs (e.g., mobile APs and/or fixed APs) or other nodes of the network 710 including, for example, one or more Cloud-based servers (e.g., the DTN server 720 shown in FIG. 7). The MAP 1 701 of the network 710 is also communicatively coupled to a sensor 1 702 and sensor 2 703, a fixed AP FAP 1 706, and mobile APs MAP 2 704 and MAP 3 705. In the example arrangement of FIG. 7, the functionality of the DTN server 720, the mobile APs MAP 1 701, MAP 2 704, and MAP 3 705; and the fixed AP FAP 1 706 manage and implement data storage and dissemination rules for the upstream transfer (i.e., "uploading") of data from the APs (e.g., the FAP 1 706, MAP 1 701, MAP 2 704, and MAP 3 705) to the DTN server 720, and for the "downstream" transfer (i.e., "downloading" or distribution) of data from the DTN server 720 to the APs (e.g., the FAPs and MAPS). For example, in accordance with various aspects of the present disclosure, the DTN functionality of the mobile AP MAP 1 701 of FIG. 7 may, for example, be fed with context information from the current neighbors of the mobile AP MAP 1 701 (i.e., FAP 1 706, MAP 2 704, MAP 3, Sensor 1 702, and Sensor 2 703), and with context information from the Cloud and the DTN server 720.

Figure 8:
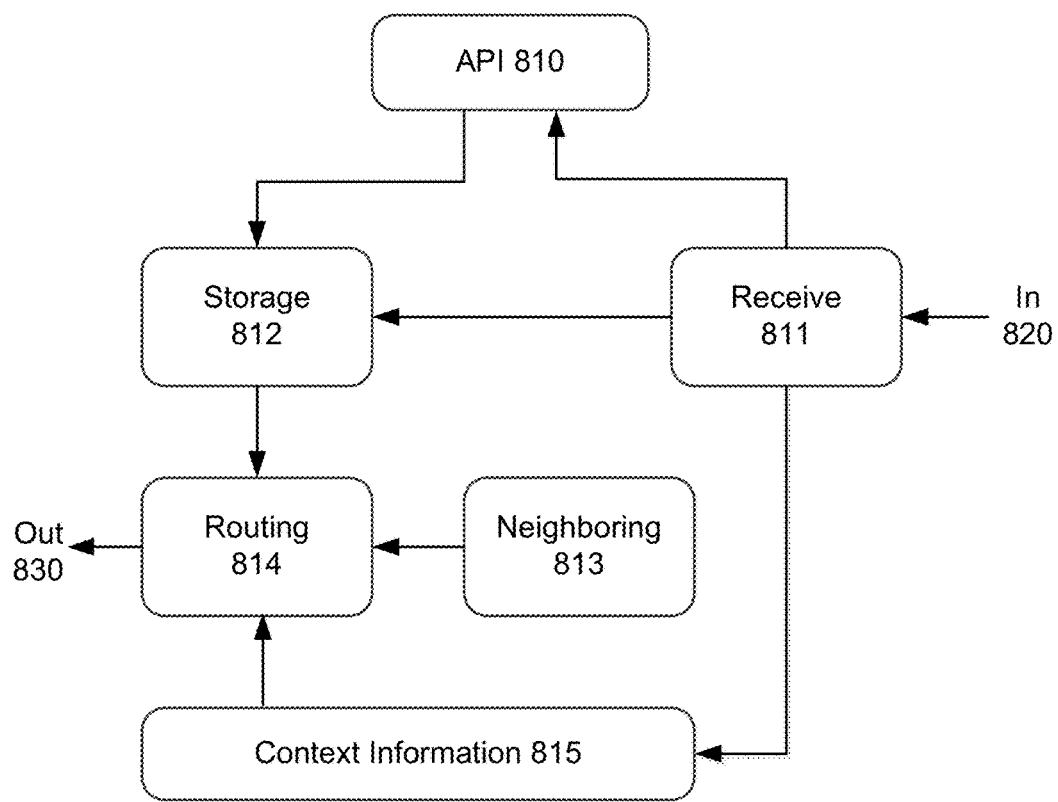
FIG. 8 shows a block diagram of example delay tolerant networking functionality for implementing data retention and dissemination rules of nodes of a network of moving things, in accordance with various aspects of the present disclosure.

FIG. 8 shows a block diagram of example delay tolerant networking functionality 800 for implementing data retention and dissemination rules of nodes of a network of moving things, in accordance with various aspects of the present disclosure. The DTN functionality 800 illustrated in FIG. 8 comprises an API functional block 810, a receive functional block 811, a storage functional block 812, a neighboring functional block 813, a routing functional block 814, and a context information functional block 815. It should be noted that the functionality of the various blocks of FIG. 8 may be realized in hardware/circuitry, executable instructions/software code, logic, and/or any combination of the above.

The neighboring functional block 813 of FIG. 8 is configured to maintain an updated list of all neighbor nodes of the network node containing the functionality of FIG. 8. Such a list of neighbor nodes may contain data items/entries for each neighbor node, where the data items/entries for each neighbor node may include any of the context information discussed above with respect to neighbor nodes. For example, such a list entry for a neighbor node may include, by way of example and not limitation, the type of the neighbor node (e.g., FAP, MAP, Sensor, NC, etc.); the geographic location of the neighbor node (e.g., latitude/longitude); the speed, direction, and/or a path of travel of the neighbor node (i.e., for neighbor nodes that are MAPs); as well as other context information such as a received signal strength indication (RSSI) for the neighbor node. The neighboring functional block 813 may interact with, for example, an operating system of the node in which the functionality of FIG. 8 resides, to obtain information about the available neighbors of the node, such as mobile and fixed APs, Wi-Fi neighbors, or neighbors in other technology (e.g., Bluetooth, DSRC, etc.).

The receive functional block 811 is configured to receive and process incoming bundles (i.e., via In 820) from other nodes of the network. The receive functional block 811 may interact with the storage functional block 812 to store received bundles and characteristics about the stored bundles, and to access characteristics about the stored bundles. Such characteristics may include those described herein such as, for example, the size of the bundle, metadata such as a file extension that associates the data of the bundle with a particular software application, a type of data of the bundle, a latency sensitivity of the bundle, a "time-to-live" of the bundle, and a type of network connection over which the bundle is to be communicated, to name just a few characteristics. Such stored characteristics may be accessed for the purpose of creating acknowledgements (ACKs) and/or other messages (e.g., a response indicating that the data of the bundle was previously received, a response indicating that the storage for bundles at the node is full, etc.), regarding the received and/or stored bundles. The receive functional block 811 may, for example, implement data retention rules that are used to determine which received bundles are to be stored in the storage functional block 812.

The routing functional block 814 is configured to generate and send messages to other nodes of the network. The routing functional block 814 may, for example, interact with neighbors of a network node (e.g., nodes within wireless communication range of the node in which the routing functional block 814 resides), to acquire and maintain updated information about the current neighbors of the node, and may interact with the storage functional block 812, to "peek" a bundle. The term "peek a bundle" may be used herein to refer to an action by a network node (e.g., a fixed or mobile AP, NC, sensor, etc.) to, for example, get access to or a copy of a bundle, or access to or a copy of the headers of a bundle (e.g., from storage), to enable the network node to determine, using the information in the bundle, when, where, and to whom to send the bundle. The routing functional block 814 may be configured to implement data dissemination rules used to determine, by way of example and not limitation, which received bundles are to be sent, which node(s) are to receive the bundles that are sent, the communication link(s) (e.g., Wi-Fi, DSRC, Bluetooth, cellular) to be used for sending the bundles, the settings to be used on the communication link(s) (e.g., the data rate, the modulation scheme, any time-out values, maximum number of retries, etc.) to be used when sending the bundles, etc. The routing functional block 814 of a node may, for example, operate to define data storage and dissemination rules related to one or more conditions in which bundles are dropped by the node, and how prioritization and scheduling of the transmission of bundles is done by the node. Such rules may, for example, provide for multiple classes of service in regards to bundle delivery delay and loss tolerance.

The storage functional block 812 is configured to maintain a data structure having records/entries for all bundles received by the node (e.g., organized in different lists, organized by a type of storage device used to store the bundle (e.g., a memory card (e.g., SD/SDHC/SDXC, CF, etc.), system FLASH memory, battery-backed RAM, and/or other forms of data storage). The storage functional block 812 may interact with the receive functional block 811 and the routing functional block 814, to provide access to, to retrieve, and/or to store data, as well as other functions that may be used to collect/generate context information.

The context information functional block 815 is configured to collect information from the neighbors of a node, from a remote server (e.g., the DTN server 720 of FIG. 7), and from the Cloud. The routing functional block 814 and the receive functional block 811 may then use the context information to configure and implement data storage and dissemination rules.

The application programming interface (API) functional block 810 of a network node is configured to parse instructions, referred to herein as "API calls," that are received by the node via the receive functional block 811. The API functional block 810 may then validate and/or authenticate the received API calls, and may then perform or cause the performance of operations requested by valid and/or authenticated API calls. Such API calls may include, for example, an API call to store data to the storage functional block 812, and an API call to fetch data from the storage functional block 812 for transmission via the routing functional block 814.

In an example implementation in accordance with various aspects of the present disclosure, control communications among network nodes (e.g., mobile APs, fixed APs, and a DTN server) may use a short "common header" for all types of messages, and may use a "type-specific header" that follows the "common header." Such type-specific headers may include, for example, what may be referred to herein as a "bundle header" (e.g., a header specifically used for messages carrying data being disseminated), what may be referred to herein as an "ACK header" for use in an acknowledgment message, and other type-specific headers for various "control messages."

The term "control message" may be used herein to refer to any type of packet used to communicate information/context between/among two or more network entities including, for example, one or more MAPs, FAPs, DTN server(s), sensor(s), and/or the Cloud. A control message may be a "request control message" that may be used, for example, to request any type of information from one or more other node(s), or a "response control message" that may be used to provide a response to a request from another node. For example, a "response control message" may be used to provide context information about status of particular bundles, about the probability of being within range of wireless communication (e.g., "contact") with a particular network node, and/or about the presence of new bundles in a network in accordance with various aspects of a network of moving things as described herein.

In a network in accordance with aspects of the present disclosure, an "ACK message", as well "response control messages" or any type of "control message" may include space for one or more "flags." Such flags may be used by a receiving node to provide additional information about the status of delivery of a control message, as well as the status of the responding neighbor, to the sending node. Examples of such status information include, but are not limited to, whether storage at the neighbor is full, whether the neighbor is experiencing any sort of technical problem(s), whether the neighbor accepts custody of the data just sent to the neighbor, whether the neighbor received and stored the data just received, whether a sufficient number of data fragments are available to enable reconstruction of the file of which the data is a part, and whether the data sent to the neighbor was already stored at the neighbor.

In an example implementation according to aspects of the present disclosure, the neighboring functional block 813 may provide context information including, for example, updates on the state of neighboring nodes. Such context information may be real-time context information, in that such information may reflect the state of a neighbor node within a short period of delay (e.g., within millisecond, tens of milliseconds, or a few hundred milliseconds of existence of the state at the neighbor node). In accordance with aspects of the present disclosure, changes in a list of neighbors maintained by any given network node (e.g., located in an operating system Kernel of the node) may be announced to the DTN. Such an announcement of changes may be sent to any network node that belongs to the DTN including, for example, neighbor nodes, neighbors of neighbor nodes, and a DTN server. In accordance with aspects of the present disclosure, the neighboring functional block 813 of any network node may pre-filter the list of neighbors that the node maintains. The pre-filtering may be performed before the list of neighbors of the node is announced to the DTN. Such pre-filtering may, for example, be based on context information maintained by the node including, by way of example and not limitation, RSSI measurements of wireless signal(s) from the neighbor node(s), an average time between reboots of the neighbor node(s), an indication of one or more technical (e.g., electrical, software, etc.) problem(s) at the neighbor node(s), and/or other information that is a factor in assessing the reliability or stability of the neighbor node(s). Such pre-filtering may produce a list of the "best" or "healthiest" neighbors, which may identify those neighbors that may be relied upon to operate predictably and reliably. In this manner, the routing functional block 814 of a node may then use the filtered list of neighbor nodes in configuring and implementing data storage/retention and dissemination rules. In accordance with various aspects of the present disclosure, one or more thresholds for one or more parameter values used in the pre-filtering process (e.g., a minimum RSSI for a node to be considered as providing a usable wireless communication link) may be adjusted dynamically, based on a variety of factors including, for example, feedback from previous communication with neighbor nodes, the size of a particular bundle to be transmitted to a neighbor node, and/or the like.

In accordance with aspects of the present disclosure, data storage/retention and dissemination rules for downstream data may determine, by way of example and not limitation, whether a bundle is sent as unicast, multicast, or broadcast traffic; whether a recipient of the bundle is to send an ACK; and/or whether an end-to-end ACK for a bundle is to be sent to and/or from a DTN server (e.g., DTN server 720). Such data storage/retention and dissemination rules for downstream data may also determine, for example, how many replicas/copies of a particular bundle should be sent by a particular sender or a particular type of sender (e.g., the sender originating the bundle and communicating the bundle to an intermediate node, an intermediate node communicating the bundle to another intermediate node, a sender communicating the bundle to a DTN server, and/or other types). Data storage/retention and dissemination rules for downstream data of a network, in accordance with aspects of the present disclosure, may determine, by way of example and not limitation, whether to use fixed access points as anchors (i.e., whether a mobile AP should only send or receive a bundle that originated at a fixed AP, when in range of a fixed AP). Such data storage/retention and dissemination rules for downstream data may also determine, by way of example and not limitation, whether to request control information from fixed APs and/or the Cloud, to help the download of a particular file (e.g., information about how many more fragments are needed to be able to decode the particular file, how many fragments of a particular file have been received so far, and/or the like); and/or whether a device, or a bundle is currently on, or should be added to, a "blacklist." The term "device" may be used in this context to refer to, for example, a network node (e.g., a fixed or mobile AP, NC), an end-user device (e.g., a cellphone; smart phone; tablet, laptop, or other type of computer), or a sensor, if such a device is part of a DTN. In accordance with aspects of the present disclosure, a device or node that has been "blacklisted" may not be used to send bundles, and may be avoided by other network nodes, etc., since the device or node may be "blacklisted" for many reasons including, for example, poor network performance, full/limited storage capacity, and/or security issues, to name only a few reasons.

Figure 9:
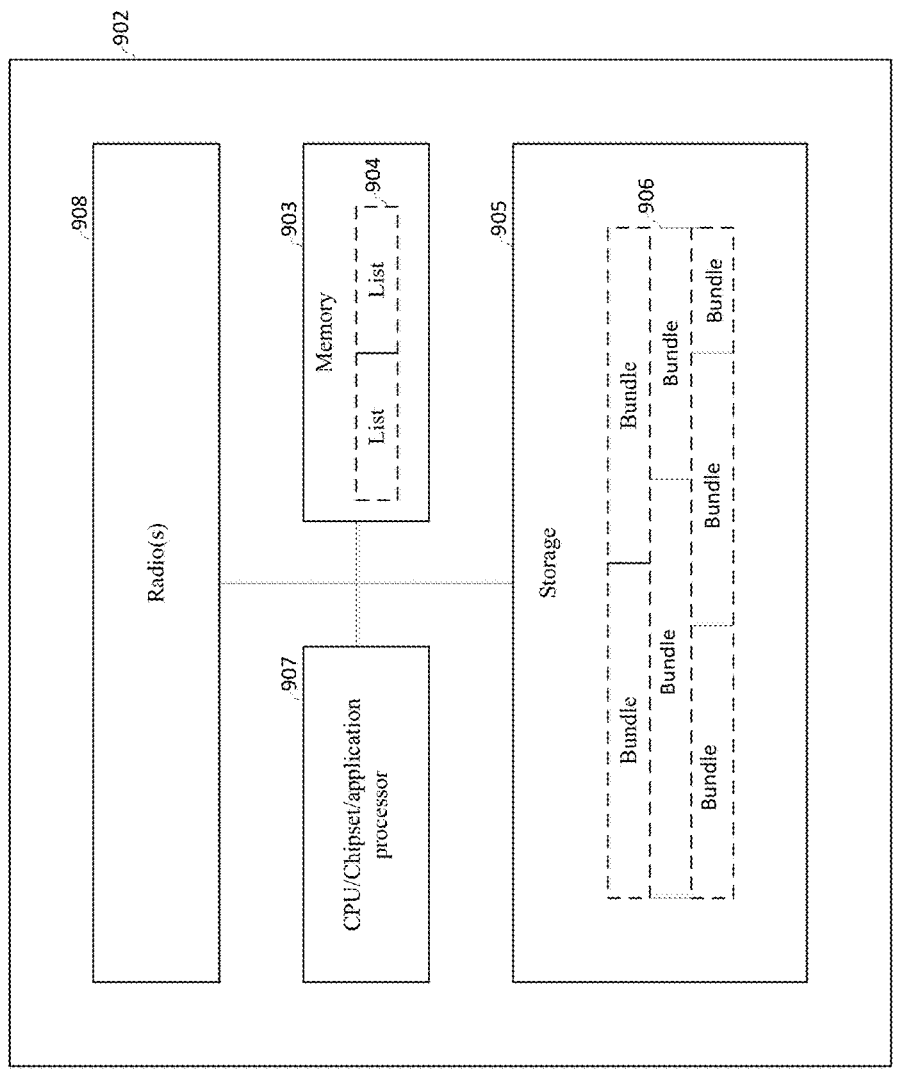
FIG. 9 is a block diagram showing an example node of a network of moving things, in accordance with various aspects of the present disclosure.

FIG. 9 is a block diagram showing an example node 902 of a network of moving things, in accordance with various aspects of the present disclosure. The network node 902 of FIG. 9 may correspond to, for example, a fixed AP or mobile AP as discussed above with regard to FIGS. 1-8. As shown in the example illustrated in FIG. 9, the network node 902 includes memory 903, storage 905, a central processing unit (CPU)/chipset/application processor 907, and one or more radio frequency (RF) wireless network interfaces ("radios") 908. In accordance with some aspects of the present disclosure, the memory 903 may, for example, be a relatively faster form of memory that may be volatile (e.g., semiconductor read/write memory), while storage 905 may be a relatively slower form of memory that may be non-volatile (e.g., a moving media-based device (HDD), and/or a "flash-based" solid state drive (SSD)). In accordance with aspects of the present disclosure, the memory 903 and/or storage 905 may be made up of a number of individual memory devices or circuits of different access speeds and capacities. For example, the memory 903 may be made up of one or more semiconductor memory devices and the storage 905 may be made up of one or more "flash-type memory"-based and/or moving magnetic media-based storage devices. The memory 903 may, for example, have a data capacity that is relatively smaller than the data capacity of a relatively-larger storage 905. In addition to the storage of bundles of data and lists, the storage 905 and memory 903, respectively, may also be used to store software programs in the form of executable code for execution by the central processing unit (CPU)/chipset/application processor 907, for example.

In accordance with aspects of the present disclosure, nodes of the network (e.g., node 902 of FIG. 9) may maintain one or more lists 904 to keep track of information and/or characteristics of upstream and/or downstream bundles 906 that are received or created by the node 902, that are needed by the node 902, and/or that are stored in the node 902 awaiting transmission to another node of the network and/or, for example, a Cloud-based server and/or system (e.g., DTN server 720 of FIG. 7). Such information may include all or only a portion of the information contained within what is referred to herein as a "bundle header," and such bundle headers may be linked to form the lists 904 to enable efficient access to information about the bundles of data 906 in the storage 905. Various aspects of this disclosure provide for determining, for example, the number, size, and/or contents of such lists 904 so as to enable quick access (e.g., storage, deletion/dropping, and/or retrieval) of bundles 906. It should be noted that although FIG. 9 shows two lists 904, that is for illustrative purposes only, and does not represent a limitation of the present disclosure, as the number of lists may be greater or fewer.

Additional aspects of this disclosure provide methods and systems for network nodes to decide where, when, and in what form (e.g., compressed or uncompressed) to transmit, store, and/or delete/drop bundles (e.g., bundles 906), taking into account a variety of node context information. Such node context information may include, by way of example and not limitation, a maximum capacity of the storage 905; an amount of storage space available in a specific node; a node's capabilities to manage the data; and the type(s) of storage 905 in the node including, for example, physical moving media (e.g., hard disk drive(s)), solid state drives (e.g., electronic data storage such as "flash" or other non-volatile forms of storage), and/or volatile memory (e.g., random access semiconductor memory), etc. The capabilities of a node to manage data may include, for example, any or all of the resources of the node including, by way of example and not limitation, the amount of memory and/or storage (e.g., megabytes, gigabytes, etc.), the types of memory and/or storage (e.g., semiconductor random access memory (RAM), read-only memory (ROM), Secure Digital (SD) card memory, mass storage devices (e.g., flash-based solid-state drive(s) (SSDs), moving media based hard disk drive(s) (HDDs), and/or memory and/or storage access/read/write speeds/times, to name just a few characteristics/capabilities of a network node. Node context information may also include, for example, various characteristics of different types of node storage (e.g., latency, read/write speed), characteristics of different types of bundles (e.g., different bundle types may be associated with different applications/services), various expiration times of various bundles (e.g., expiration date/time, "time-to-live"), various priorities of various bundles, and/or the like.

Figure 10:
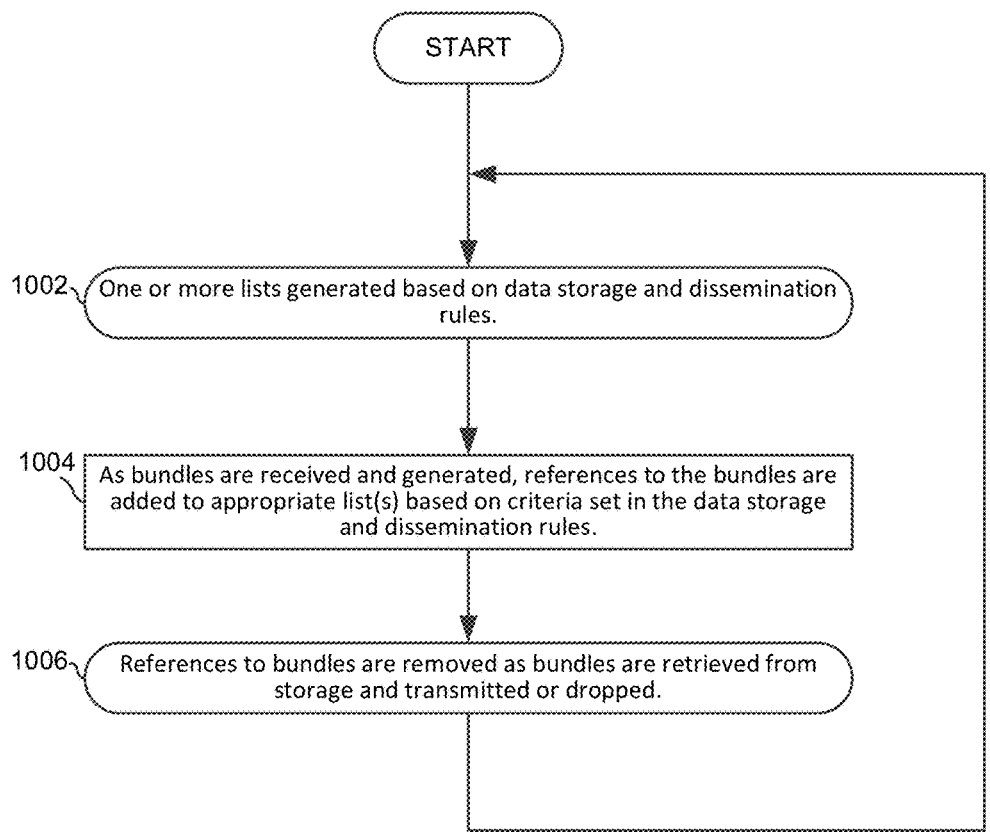
FIG. 10 shows a high-level flowchart for an example method of managing the storage, retrieval, dropping, and dissemination of bundles of data, in accordance with various aspects of the present disclosure.

FIG. 10 shows a high-level flowchart for an example method of managing the storage, retrieval, dropping, and dissemination of bundles of data, in accordance with various aspects of the present disclosure. The circuitry, software, and/or logic of network nodes such as, for example, a DTN server, mobile APs, and/or fixed APs in accordance with the present disclosure may be operable to select and implement data dissemination and storage rules that generate and maintain various lists (e.g., list(s) 904 of FIG. 9) used for managing the receiving, storing, dropping, and dissemination of bundles of data. In the example method of FIG. 10, at block 1002, one or more such list(s) may be generated, based on data storage and dissemination rules as described herein. Next, at block 1004, as bundles of data are received by, and/or generated in, the node performing the method, references to the bundles of data may be added to the list(s). In accordance with various aspects of the present disclosure, one or more lists may contain references to various bundles stored in the node, based on one or more criteria. For example, the list(s) in which a particular bundle of data is referenced may depend on criteria such as, by way of example and not limitation, whether the bundle is destined for an upstream destination (e.g., a DTN server or Cloud-based system) or is destined for a downstream destination (e.g., one or more mobile AP(s) or end-user devices). The list(s) in which a particular bundle of data is referenced may also depend on, for example, the network node that is the source of the bundle of data (e.g., a first list for bundles created by the node, and a second list for bundles received from other nodes), and/or the network node that is the destination of the bundle of data (e.g., a first list for bundles of data that are intended to be disseminated to all nodes of the network, and a second (or third, fourth, etc.) list(s) for bundles of data corresponding to particular node(s) to which the listed bundle(s) are intended to be delivered). In addition, the list(s) in which a particular bundle of data is referenced may depend on, for example, whether the bundle of data is to be retransmitted by the node, and/or whether the bundle of data has been received by the node (e.g., a list may track bundles of data that hold particular portions of one or more particular files that are still needed by the node, in order for the node to have the entire contents of the one or more particular files at the node). The list(s) in which a particular bundle of data is referenced may also depend on, for example, a priority level of the bundle of data, an application/service associated with the bundle of data, and/or the like. Tracking bundles of data via the one or more lists enables quickly storing new bundles of data, retrieving stored bundles for use (e.g., inspection/"peeking," transmission), efficiently deciding which stored bundles of data to discard/drop if necessary (e.g., when an expiration data and/or time, or the "time-to-live" of a bundle has expired), etc. At block 1006 of FIG. 10, references to bundles of data (i.e., entries in one or more list(s)) may be removed from the list(s), as the corresponding bundles of data are discarded/dropped and/or retrieved from storage and transmitted.

In accordance with various aspects of the present disclosure, a network node (e.g., a DTN server, mobile AP, fixed AP, and/or end-user device) may maintain one or more linked list(s), each list containing a portion of each of the bundles of data (e.g., some or all of the information of a bundle header) in the storage (e.g., storage 905 of FIG. 9) of the node, in order to enable the node to quickly and easily retrieve, update, and/or discard/drop a particular bundle of data that is already in the node, or to store a new bundle of data received or created/generated by the node. For example, such a linked list may be ordered (e.g., indexed) according to one or more conditions that are desired criteria for bundle search. For example, if it is desired that the node be able to rapidly retrieve bundles of data with the soonest expiration date, the list may be indexed by expiration time or "time-to-live." There may be as many such linked lists as there are criteria on which it is desired to retrieve bundles (e.g., each linked list indexed by a different criterion). The lists may, by way of example and not limitation, be kept in memory (e.g., memory 903 of FIG. 9) in the form of a table having an indexed field and a pointer to a main table in which the corresponding bundle header is stored.

In accordance with aspects of the present disclosure, context information as described herein may be used as input to what is referred to herein as a "hash function" to derive what may be referred to herein as "hashes" or "hash values." In accordance with aspects of the present disclosure, such "hashes" may be used to help locate bundles of data in the storage of a network node. One or more unique, or almost unique, parameters such as, for example, items/parameters of context information as described herein (e.g., node identification information (i.e., a node ID), a bundle expiration date/time, or some or all of the payload data of a bundle) may be used with a "hash function" to generate a "hash value" that may be used as a unique identifier of a file inside the network. For example, using an identifier of a network node (e.g., a media access control (MAC) address) and a timestamp representing a time (e.g., UNIX time, Greenwich Mean Time (GMT), local time-of-day)) or a date and time (e.g., "Jan. 8, 2014" of "01082014" and "12:03 PM" or "120300") when, for example, the network node generated the file may, for example, yield a hash value that is likely (e.g., above some desired threshold probability) to be unique within a network according to the present disclosure. The use of a hash value that is expressed as a relatively larger number of bits (e.g., 32 bits or 64 bits) versus a relatively smaller number of bits (e.g., 16 bits or 24 bits) may be used to increase the likelihood of uniqueness of the hash value. The likelihood of uniqueness of a hash value may be further increased by the fact that bundles of data (and therefore the portions of files held in the bundles of data) as described herein may have a finite "time-to-live" before being discarded/dropped by the nodes of the network and, therefore, that the hash value previously assigned to a bundle of data that is later discarded/dropped will no longer correspond to the discarded/dropped bundle, and the hash value may then be reused without fear of collision or conflict with the bundle/file to which the hash value was previously assigned. In accordance with aspects of the present disclosure, bundles that each carry one or more portions of a particular file, or the portions of the particular file carried by the bundle(s), may each be assigned a sequence number according to the order of the file portion within the file. Using a hash value having a length of, for example, 32 bits as a bundle/file portion sequence number, enables support for very large files.

In accordance with various aspects of the present disclosure, bundles of data may be inserted into storage in an ordered manner, so that optimized searches may later be performed with techniques such as, for example, binary searches. The available list(s) of a network node as described herein may be well defined so that, upon receiving a bundle of data, the node receiving the bundle of data clearly knows in which of the one or more list(s) to place the received bundle of data, as well as where in storage to look when the node attempts to retrieve the bundle for transmission, use, or discard/dropping.

In an example implementation, hash tables may be used to maintain the lists of bundles so as to reduce the size of lists that need to be traversed to find any particular bundle of data of interest. A relatively larger list of bundles of data may be split into relatively smaller portions having a certain order. Based on that order, the network node may go directly to the respective relatively smaller list that has the particular bundle of interest. For example, using the most significant bit of the file hash value, the node may employ a binary search technique to split the maximum hash value (e.g., 32 bits) into two smaller lists each accessed using just 16 bits of the hash value. Tash values higher than the midpoint may reference entries in the second table, and the hash values lower than the midpoint may reference entries in the first table. Using an appropriate portion of the hash value, a relatively larger list may be split into a plurality of relatively smaller lists, so that the node may quickly access/manage the storage of bundles of data, and also maintain a manageable number of such lists.

In accordance with aspects of the present disclosure, the total size of the bundles of data in the storage of a network node may be limited such that the sum of the sizes of all bundles of data of listed on all of the bundle lists of a network node cannot exceed a pre-determined maximum threshold amount. Thus, instead of defining a maximum size of each of one or more list(s) of bundles of data, a network node according to aspects of the present disclosure may define a maximum amount of storage that all of the bundles on the network node may use. In order to be more flexible, the storage of a network node (e.g., storage 905 of FIG. 9) may be organized into what may be referred to herein as "pages," where each page provides a certain fixed amount of storage space for bundles of data. In this manner, when the current pages of a network node are filled with bundles, the network node may allocate a new page, as well as reuse empty space in the existing pages to store new bundles of data. In accordance with various aspects of the present disclosure, the network node may attempt to reuse free space in existing pages by placing a bundle of data to be stored, into the smallest block of space available into which the bundle will fit. A network node may delay a "garbage collection" activity intended to recover memory/storage freed by dropped/transmitted bundles until, for example, a period of time when the network node has surplus processing resources (e.g., CPU time/cycles) available, such as when the network node has no neighbor nodes and is not busy send/receiving information to/from neighbor nodes. Aspects of the present disclosure may include a maximum allowable amount of time between garbage collection periods, to make sure that garbage collection is performed often enough to help ensure that memory/storage capacity that is no longer in use is recovered for storage of newly received/generated bundles of data and/or applications. Bundles of data that are unique to a network node may be managed so as to take into account their uniqueness in regard to communication of such bundles, the storage resources of the network node, and the importance and/or priority of the information contained in the bundle.

In accordance with various aspects of the present disclosure, a bundle of data may be assigned a priority level from a set of priority levels, which may be related not only to how quickly the bundle of data should arrive at the bundle destination, but may also be related to the tolerance of the application/client/end-user that uses the data of the bundle, to the occurrence of the loss of a bundle that is dropped/discarded while traversing a network as described herein. For example, different bundles of data may be marked with different "loss priorities" or a different "loss tolerance," so that bundles of data for which dropping/discarding of the bundle is more tolerable (i.e., to an application/client/end-user that uses the data of the bundle) may be dropped/discarded before bundles for which dropping/discarding is less tolerable, are discarded/dropped.

In accordance with various aspects of the present disclosure, a network node may, on a regular, periodic, and/or occasional basis, scan the storage of the network node and may drop/discard bundles that have expired. In a network node as described herein, some bundles of data having particular "loss priorities" associated with certain applications/clients/end-users may, for example, be marked with a "loss priority" representative of a "do not drop" loss tolerance. When such a bundle of data reaches, or nears, its expiration time (e.g., as indicated by a "time-to-live," an expiration date and/or time, or other like parameter), the bundle of data may, for example, be communicated to the bundle destination using a fall-back communication mechanism such as a commercial wireless cellular network connection, or other communications link that may be designated for this purpose, but that may not be suitable or desirable to use for normal communication of bundles of data.

In accordance with various aspects of the present disclosure, a decision may be needed to determine which of several bundles of data stored at a particular network node should be dropped/discarded, where the several bundles of data have equal priority levels. Such a decision may be based on a number of factors. Those factors may include, for example, the relative expiration times of the bundles of data in question. For example, bundles of data that expire relatively later in time may be dropped from storage at the particular network node first, based on the assumption that those later-expiring bundles of data will get another opportunity to be processed (e.g., transmitted toward the bundle destination) either in the particular network node or in another network node, at some point in the future.

Another factor that may be used in the decision to drop a bundle of data may include, for example, information that identifies the source node of each bundle of data. For example, a particular network node may choose to drop bundle replicas/copies received from other nodes of the network, before the particular network node chooses to drop bundles of data created/generated at the particular network node, based on the assumption that the received replicas/copies of a bundle also exist in other nodes, while bundles of data created/generated at the particular network node may exist only at the particular network node. The factors used in deciding which bundles to drop of a set of bundles having equal priority levels may also include information representative of whether a given bundle of the set is to be generally disseminated, or is destined for a particular node. For example, bundles that are to be disseminated by one network node to other network nodes may be a good choice to be dropped/discarded first by the sending node, since there is a high probability that the bundles to be disseminated are already stored in other nodes of the network.

In accordance with aspects of the present disclosure, data dissemination and storage rules as described herein may be different for different types of data storage (e.g., storage 905 of FIG. 9.). For example, one example strategy may be to use a non-volatile form of memory (e.g., moving media such as an HDD), or electronic storage such as a flash SSD) for the storage of bundles of data having a relatively lower loss tolerance, and to use a volatile form of memory (e.g., semiconductor RAM) for the storage of bundles of data having a relatively higher loss tolerance. In another example strategy, a non-volatile form of memory of a network node may be used to store bundles of data that originated within the network node, whereas a volatile form of memory of the network node may be used to store replicas/copies of bundles of data received from other network nodes, since there is a relatively higher probability of the replicas/copies of the bundles of data received from other network nodes also being stored on other network nodes than the relatively lower probability of a bundle of data that was created/generated (originated) on the network note also being present on another network node.

In accordance with various aspects of the present disclosure, relatively higher speed (e.g., shorter access time memory), which may be a volatile or non-volatile form of memory of a network node, may be used to maintain a cache of bundles of data that are likely to be sent by the network node in the near future. For example, volatile semiconductor memory generally has a faster access time than a SSD storage device employing non-volatile, flash-type solid state memory, which is relatively faster than a HDD storage device employing a moving magnetic media. In this way, the bundles of data may be quickly retrieved from a relatively faster form of memory (albeit volatile and therefore subject to a relatively higher probability of loss), and then sent to neighboring nodes. A network node according to various aspects of the present disclosure may estimate the time of future need of one or more particular bundle(s) of data based on, for example, the position of the network node along a route of travel (e.g., a mobile AP or end-user device) relative to the geographic location at which the need for the particular bundle(s) of data will occur (e.g., a geographic location at which the network node is within wireless communication range of another network node such as, for example, a fixed AP or mobile AP to which the particular bundle(s) is/are to be transmitted), the velocity/speed of the network node, and/or other factors.

In a network node in accordance with aspects of the present disclosure, when a network node losses electrical power and/or "reboots," all information stored in volatile memory may disappear. Such information may be able to be reloaded from a form of non-volatile memory (e.g., moving media physical memory such as a HDD, or a flash-based SSD). In accordance with various aspects described herein, this may include reloading or rebuilding one or more linked lists. Information loaded into volatile memory from non-volatile memory may, for example, include the headers or a portion of the headers of bundles of data in the linked lists and/or context information used by the network node in evaluating/processing bundles of data according to the data storage and dissemination rules discussed herein (e.g., a list of the neighbor nodes that have already received each of the bundles of data being processed/evaluated). For example, when a network node (e.g., mobile AP or fixed AP) is about to power-off/shut down (e.g., whether commanded from a Cloud-based system, or a loss of power to a mobile AP or a fixed AP), the bundle(s) of data stored in volatile form of memory and for which a loss of the bundle(s) is not tolerable may be automatically committed to non-volatile memory, to ensure that the bundle(s) of data are available when the network node reboots. In accordance with some aspects of the present disclosure, a network node such as, for example, a mobile AP may estimate the time of a future occurrence of a loss of power to the network node, based on recognition by the network node that the network node is approaching a geographic and/or wireless network location or another network node (e.g., a fixed AP) at which the mobile AP may normally be powered down, or at which the vehicle in which the network node is located (e.g., an automobile, taxi, bus, train, truck, autonomous vehicle, and/or other vehicle) may be parked for a period of time. The network node in such situations may preemptively store in a form of non-volatile storage, some or all bundles of data, bundle headers, and/or linked list information, to enable the network node to efficiently resume operation should the network node be placed in a power-down mode at or near the estimated time of a loss of power.

In accordance with various aspects of the present disclosure, a default strategy regarding the dropping/discarding of a bundle of data may be to drop the bundle of data upon reaching an expiration date, an expiration date/time, and/or the end of or expiration of a "time-to-live" of the bundle. The expiration date, date/time, or "time-to-live" assigned to a bundle of data may be carefully chosen, to ensure a desired probability (e.g., based on current context information and/or historical statistics for the network as a whole, and/or for the particular network nodes involved) that the bundle will be delivered to the intended destination of the bundle.

In accordance with various aspects of the present disclosure, an expiration date or time/time, and/or a "time-to-live" of a bundle of data may be used to determine the storage device (e.g., which storage technology/device of the storage 905) into which to store the bundle of data. For example, if a network node predicts, based on expiration and/or "time-to-live" information that the bundle of data will not be retrieved for more than a first threshold amount of time, then the bundle of data may be stored to a relatively slower form of nonvolatile storage. If, however, the network node predicts, based on the expiration and/or "time-to-live" information, that the bundle of data will be retrieved in less than the first threshold amount of time but more than a second threshold amount of time, then the bundle of data may be stored to a relatively faster-access nonvolatile storage. However, if the network node predicts, based on the expiration and/or "time-to-live" information, that the bundle will be retrieved is less than the second threshold amount of time, then the bundle may be stored in a relatively fastest volatile form of memory. The expiration date, expiration date/time, and/or "time-to-live" information for a particular bundle of data may, for example, be assigned by the software application/service that wants to send the file that is contained, in whole or in part, within the bundle of data, since the software application/service may be aware of the purpose of the file/bundle. In accordance with various aspects of the present disclosure, a system such as, for example, the DTN server 720 of FIG. 7 may enforce maximum and/or minimum expiration dates, dates/times, and/or a "time-to-live," to ensure that no software applications/services unfairly use network resources.

In accordance with various aspects of the present disclosure, network nodes as described herein may regularly, periodically, and/or occasionally (e.g., when there are no neighbor nodes) run what may be referred to herein as a "garbage collection process" to drop/discard/recover/collect expired bundles of data. A garbage collection process in accordance with aspects of the present disclosure may identify and remove information from the lists (e.g., lists 904) and storage (e.g., storage 905) used by bundles of data for which the assigned expiration date, date/time, or "time-to-live" has passed. In a network node in which at least one of the lists of bundle information (e.g., lists 904) is indexed by, for example, an expiration date or date/time, then a garbage collection process may not be necessary. This is because, when bundles of data are being stored and retrieved sufficiently frequently, a network node may discard/drop existing expired bundles of data as the network node encounters the expired bundles while navigating through the list(s) (e.g., to retrieve the next bundle of data to be transmitted, or to store a recently-received bundle of data). In such an arrangement, no separate specific/dedicated garbage collection process is needed.

In accordance with various aspects of the present disclosure, the content of files carried as data in a bundle of data may be compressed by software, logic, and/or circuitry in the network node in which they originate, thus reducing the number of bundles occupied by that file. Correspondingly, the compressed content of such files may be decompressed by software, logic, and/or circuitry at the destination network node when a sufficient number of bundles containing portions of the file content have been received. A network node may determine that the sufficient number of bundles containing portions of the file content have been received when, for example, bundles have been received that contain all portions of the original file, or when sufficient bundles have been received that contain data that permits the receiving node(s) to reconstruct the original file. It should be noted that, in accordance with some aspects of the present disclosure, the number of bundles that constitute a number of bundles sufficient to permit the receiving node(s) to reconstruct the original file may be less than all of the bundles transmitted by the sending network node or Cloud-based system if, for example, error correction encoding is used by the sending network node. Although compression of the content of files contained within bundles may involve time for processing the compressed content at the receiver of the bundles, and thus adds delay before transmission of the file content may proceed and the received files/bundles can be used, the benefits of reducing the amount of data of bundles transported through and stored in a delay tolerant vehicular network as described herein will often outweigh the drawbacks of the processing required for compression and decompression. In such instances, compression may be enabled at nodes of the network, depending upon context information collected by the network nodes and/or a Cloud-based system from which such context information and data storage and dissemination rules are distributed. In accordance with some aspects of the present disclosure, the decision of whether to use compression may, for example, be made on a per-file basis, but in other aspects of this disclosure, such a decision may be made on a per-bundle basis.

FIGS. 11A-11E show a flowchart illustrating further details of another example method of managing the storage, retrieval, dropping, and dissemination of bundles of data, in accordance with various aspects of the present disclosure. The following discussion of FIGS. 11A-11E will make reference to various elements discussed above with respect to FIGS. 1-10. The method illustrated may, for example, be performed by one or more processors of a node of a network as described herein, and may be embodied in, for example, executable code that causes the one or more processor to perform the actions of the illustrated method periodically or on an ongoing basis, for example, as a process, thread, or other means of execution of the executable code. The method of FIGS. 11A-11E begins at block 1102 of FIG. 11A, at some point in time following power-up of the network node on which the one or more processors and code reside.

Figure 11A:
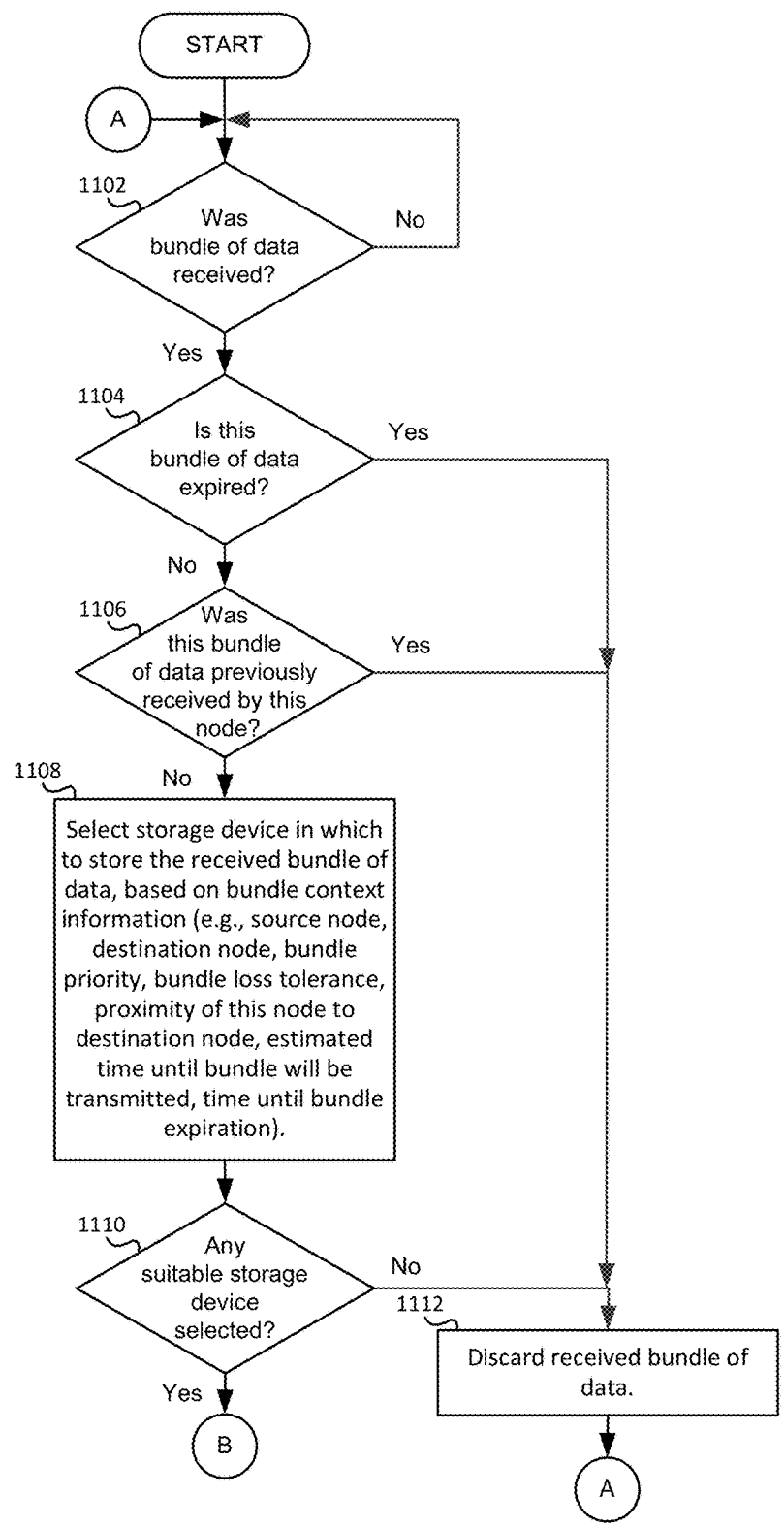
FIGS. 11A-11E show a flowchart illustrating of another example method of managing the storage, retrieval, dropping, and dissemination of bundles of data, in accordance with various aspects of the present disclosure.

Next, at block 1102 of FIG. 11A, a determination may be made as to whether a bundle of data has been received by the network node performing the method (e.g., a mobile AP or fixed AP). If no bundle of data has been received by the node, the method simply loops at block 1102, waiting for an incoming bundle of data. If, however, at block 1102, it is determined that a bundle of data has been received by the network node then, at block 1104, the method checks whether the received bundle of data is expired. Such as check may use a date, a date and time, or a "time-to-live" parameter contained within, for example, a bundle header portion of the received bundle. A bundle header may contain items of what may be referred to herein as bundle context information such as, for example, the bundle-related context information items and parameters described above. If, at block 1104, it is determined that the received bundle is an expired bundle, the method may continue at block 1112, where the received bundle may be discarded/dropped by the network node. However, if the received bundle of data is not expired, the method of FIG. 11A continues at block 1106.

At block 1106 of FIG. 11A, a determination may be made as to whether the received bundle was previously received, and therefore may already reside in storage of the network node. Such a check may include, for example, accessing one or more lists of bundle information such as the list(s) 904 of FIG. 9, described above. If it is determined, at block 1106, that the received bundle was previously received by the network node, the network node may then, at block 1112, discard the received bundle, because the received bundle of data is a copy or duplicate of a bundle of data already stored at the network node, and is not needed. Additional information about the use of replication of bundles of data during transmission between nodes of a network in accordance with the present disclosure may, for example, be found in U.S. patent application Ser. No. 15/456,441, titled "Systems and Methods for Managing the Routing and Replication of Data in the Upload Direction in a Network of Moving Things," filed on Mar. 10, 2017, and U.S. patent application Ser. No. 15/478,181, titled "Systems and Methods for Managing the Routing and Replication of Data in the Download Direction in a Network of Moving Things," filed on Apr. 3, 2017, the content of each of which is hereby incorporated herein by reference, in their respective entireties. If, however, the received bundle of data was not previously received by the network node, the method may then continue at block 1108, described below.

At block 1108 of FIG. 11A, the method may select a storage device of the network node, such as the storages devices described above, in which to store the received bundle of data. In accordance with various aspects of the present disclosure, the choice of storage device may, for example, be based on bundle context information such as the source network node from which the received bundle originated, the destination node to which the received bundle of data is directed, and a bundle priority indicating the importance of timely delivery of the received bundle to the destination node, relative to the timely delivery of other bundles of data traversing the network of the present disclosure. The choice of storage device may also be based, for example, on a loss tolerance of the received bundle of data, the physical distance or proximity of the network node to the destination node; an expiration date or date/time, or a "time to live" of the received bundle, and an estimate of the amount of time until the received bundle will be transmitted by the network node. Additional details of an example process of selection of a storage device that may, for example, correspond to the actions of block 1108, may be found below with regard to the illustration of FIGS. 11C to 11E, beginning at block 1130 of FIG. 11C.

Next, at block 1110 of FIG. 11A, the method may determine whether any suitable storage device was selected at block 1108. If, at block 1110, it is determined that no suitable storage device was selected at block 1108, the method may proceed to block 1112, where the received bundle may be discarded/dropped, because the network node performing the method has determined that no suitable storage device is available in which to store the received bundle of data. The method then continues at block 1102. If, however, a suitable storage device was selected at block 1108, the method of FIG. 11A continues at block 1114, shown in FIG. 11B.

Figure 11B:
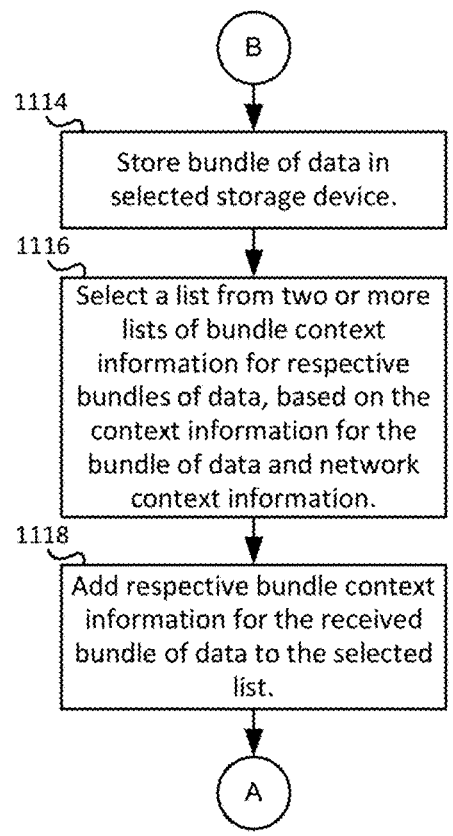

At block 1114 of FIG. 11B, the method may store the received bundle of data in the storage device selected at block 1108, and at block 1116, may select a list from two or more lists of bundle context information for respective bundles of data, based on the context information for the received bundle of data and/or network context information. Such lists may, for example, correspond to the list(s) 904 of FIG. 9, described above. Additional details of bundle context information and network context information was described earlier in this application. After selecting the list(s) to which entries are to be added for the received bundle of data stored at block 1114, the method may, at block 1118, add the respective bundle context information for the received bundle of data to the list(s) selected at block 1116. As described above, adding bundle context information to the selected list may involve linking information from a bundle header of the received bundle of data to one or more lists, where adding may comprise inserting an entry for such information into a list such as a linked list. Upon completion of the actions of block 1118, the method of FIG. 11B proceeds to block 1102 of FIG. 11A, described above.

Figure 11C:
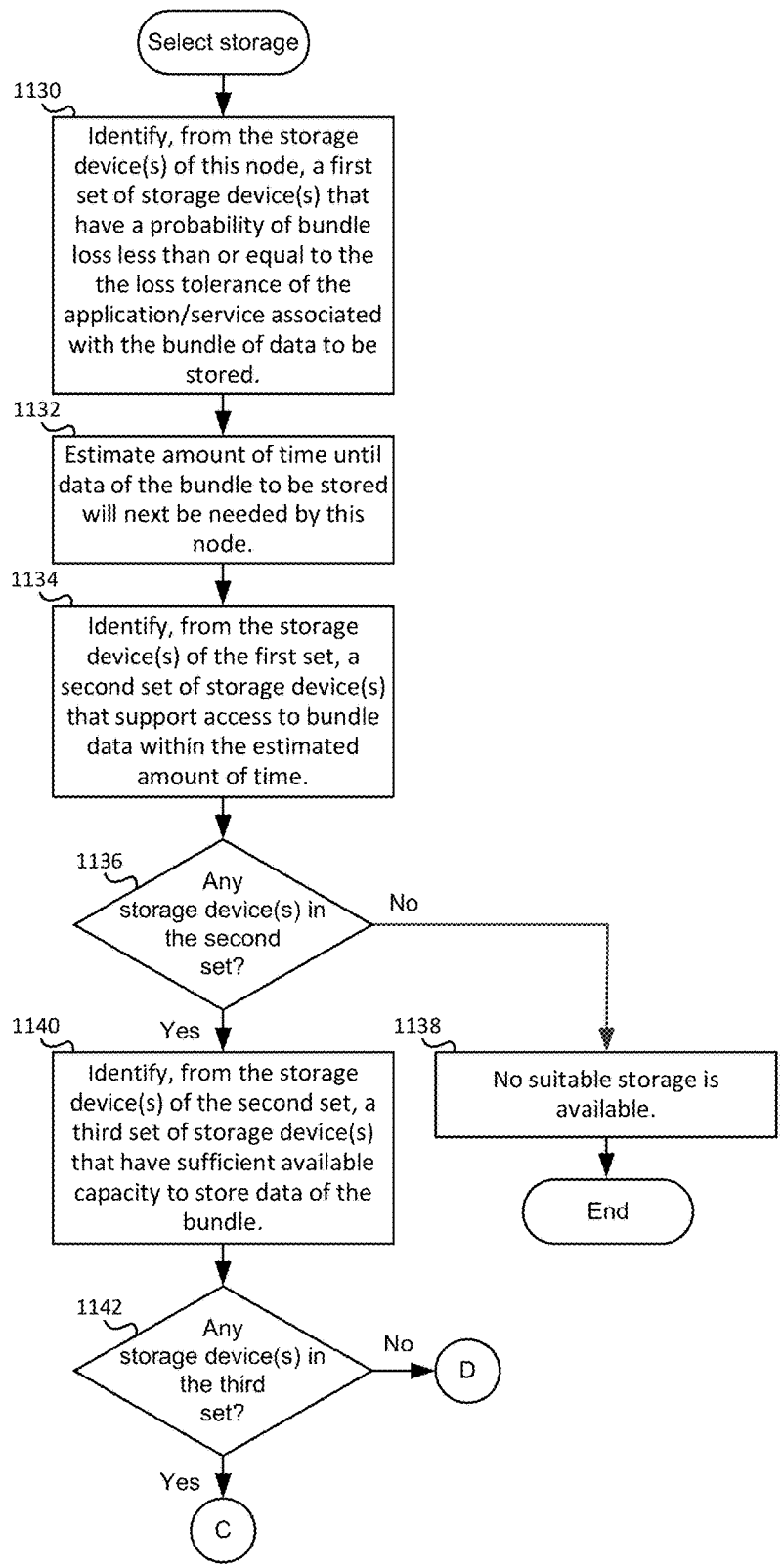

Our attention now turns to block 1130 of FIG. 11C, where an example process of selecting a storage device on which to store a bundle of data, begins. At block 1130, the method of FIGS. 11A-11E identifies, from those storage devices present at the network node, a first set of storage devices. The first set of storage devices may, in accordance with various aspects of the present disclosure, be those storage devices that have a probability of loss of a bundle of data that is less than or equal to the loss tolerance of the application or service associated with the bundle of data to be stored. In this manner, the storage devices identified by the network node, at block 1130, are able to meet the loss tolerance expectations/requirements associated with the application/service that generated or will consume/use the bundle of data to be stored.

Next, at block 1132, the method may calculate an estimate of the amount of time from receipt of the bundle of data until the data of the received bundle will next be needed by the network node. The network node may, for example, have one or more software applications running on the network node that may require access to the received bundle of data at a future time, and/or the network node may determine that the received bundle of data is to be disseminated by the network node to other nodes of the network described herein when, for example, those other nodes are within wireless communication range of the network node. In either case, the method may, at block 1132, determine an estimate of an amount of time for which the received bundle of data may be in the selected storage device (e.g., the storage devices used to implement the storage 905, described above), before being accessed/retrieved for processing or dissemination by the network node. Because, as described above, a network node according to aspects of the present disclosure may use various types of storage devices (e.g., volatile or non-volatile, moving media or semiconductor memory technologies), the speed of access to such storage devices may be taken into account when storing a bundle of data at a network node. It should be noted that estimating the amount of time needed to store a bundle of data and/or access a stored bundle of data may also include, for example, estimating an amount of time needed to compress an uncompressed bundle of data and/or decompress a compressed bundle of data. In accordance with various aspects of the present disclosure, the compressed/not compressed state of a bundle of data in accordance with aspects of the present disclosure may be part of the respective bundle context information for a bundle of data. In accordance with various aspects of the present disclosure, a bundle of data may, for example, be compressed/not compressed for purposes of more efficient use of wireless or wired communication links used in transmitting the bundle of data between network elements (e.g., Cloud-based systems, mobile and/or fixed APs, end-user devices) and/or for purposes of conservation of storage device capacity at the network elements or nodes.

Next, at block 1134, the method may identify, from the storage devices in the first set, a second set of storage devices that support access to data of stored bundles of data, within the amount of time estimated at block 1132. That is, the network node performing the method may use information about the received bundle of data (e.g., the bundle context information) and characteristics of the storage devices in the first set of storage devices, to determine which storage devices in the first set are able to provide access to the data of a bundle within the time in which the data of the bundle may be needed by the network node or a software application or service running on the network node. For example, a mobile AP or a fixed AP may have received or generated a bundle of data to be stored on a storage device, and may need take into account the amount of time required by each of the types of storage devices on the mobile or fixed AP to provide access to the bundle of data, once stored, to enable the network node to decide on which storage device is suitable to store the received bundle. For example, a first mobile or fixed AP may have a limited amount of time in a window in which to wirelessly communicate with a second mobile or fixed AP, and choosing the correct storage device may permit more frequent and/or faster wireless transfers of larger amounts of data.

Figure 11D:
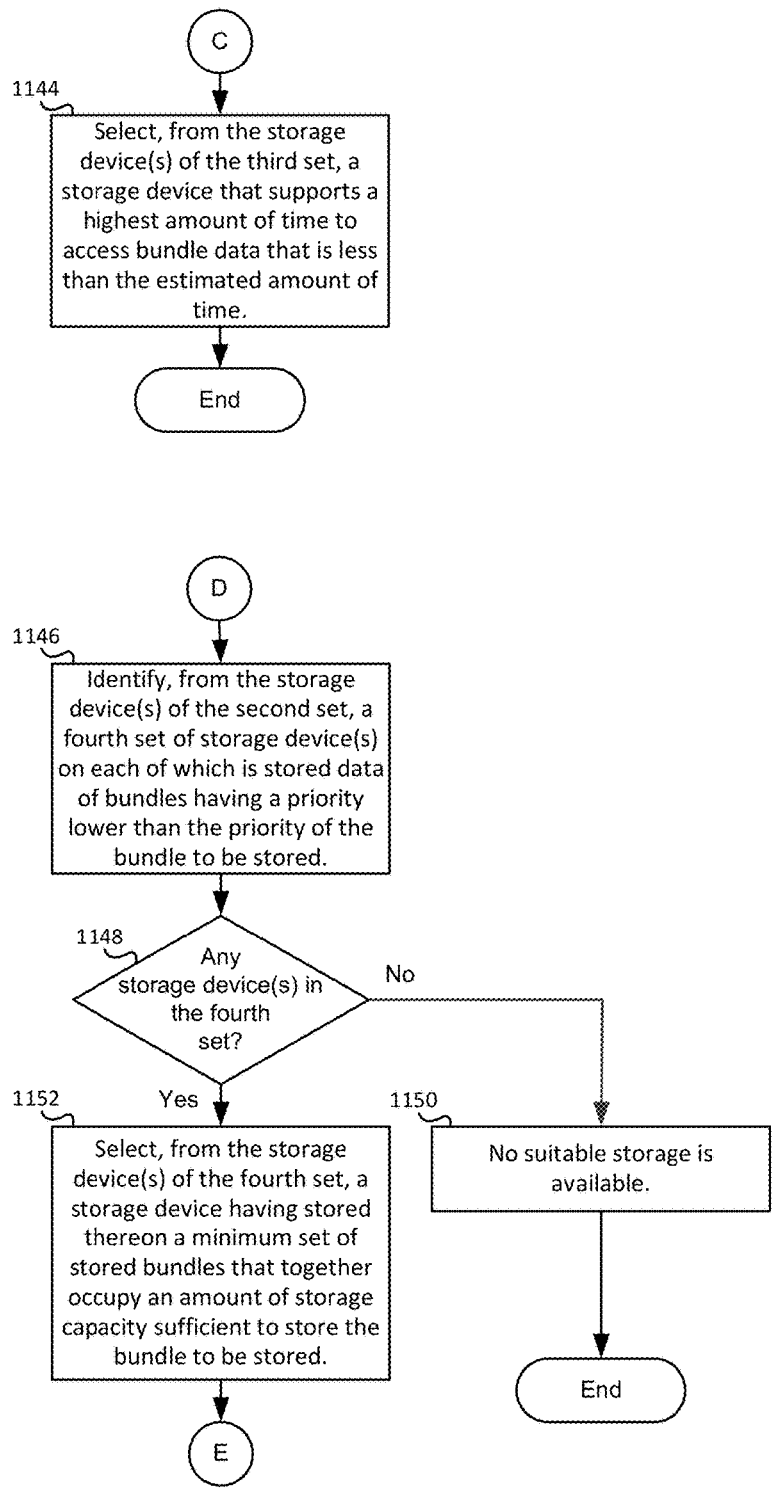
Figure 11E:
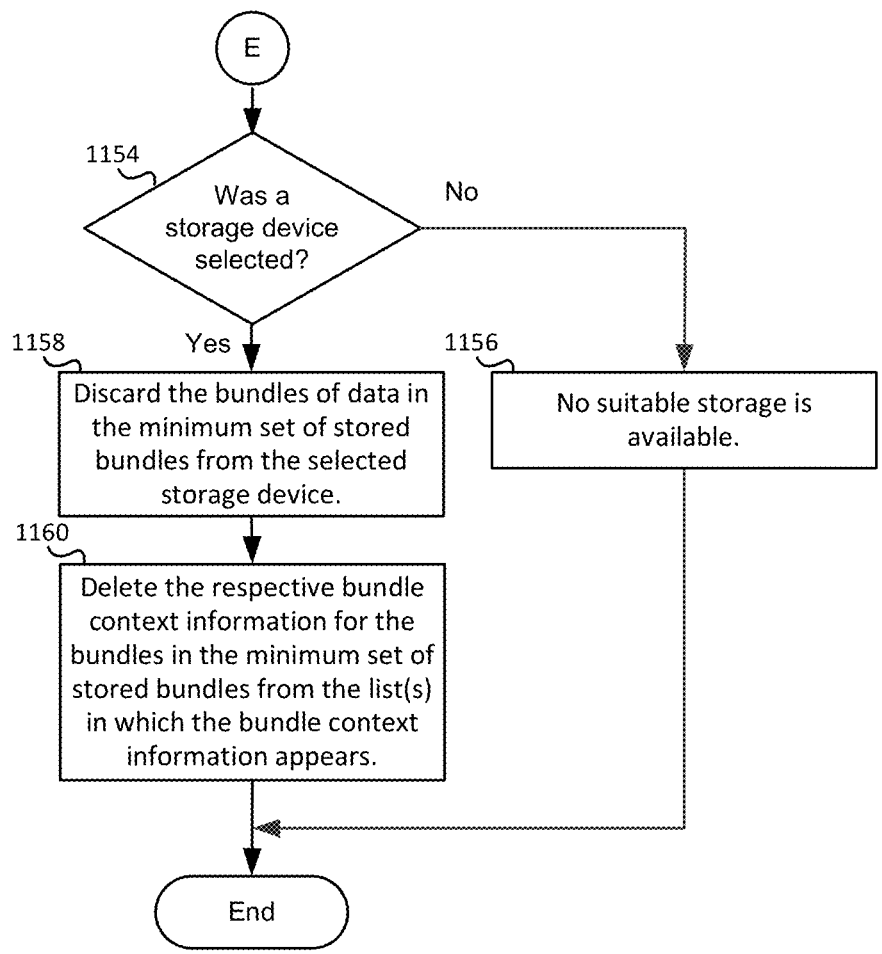

At block 1136, the method of FIGS. 11C-11E may determine whether there are any storage devices in the second set. If the second set of storage devices is empty (i.e., none of the storage devices in the first set meet the criteria of block 1134), the method proceeds at block 1138, where it is recorded that the network node has no suitable storage devices available for storing the received bundle of data. The portion of the method of FIGS. 11C-11E then continues at block 1110 of FIG. 11A, as described above. If, however, it is determined at block 11136 that the second set of storage devices is not empty, the method continues at block 1140, where the method may identify, from the storage devices in the second set, a third set of storage devices that have sufficient available capacity to store the received bundle of data.

Next, at block 1142, the method may determine whether there are any storage devices in the third set of storage devices. If, at block 1142, the network node performing the method determines that there is at least one storage device in the third set then, at block 1144 of FIG. 11D, the method may select, from the storage devices of the third set, a storage device whose maximum amount of time to access a bundle of data is less than the estimated amount of time determined at block 1132, and the method may then record selection of a storage device of the network node for storage of the received bundle of data. The portion of the method of FIGS. 11C-11E then continues at block 1110 of FIG. 11A, as described above. If, however, at block 1142, the network node performing the method determines that there is not at least one storage device in the third set, then the method of FIGS. 11A-11E may continue at block 1146.

At block 1146 of FIG. 11D, the processor(s) performing the method may identify, from the storage devices of the second set, a fourth set of storage devices on which is stored one or more bundles of data each having a bundle priority lower than the priority of the bundle of data to be stored (i.e., the received bundle of data). This is done to allow one or more less important bundles to be deleted/discarded, to allow the received bundle of data (of higher priority) to be stored. Next, at block 1148, a determination may be made whether there are any storage devices in the fourth set (i.e., that are candidates for deletion from a suitable storage device. If, at block 1148, it is determined that there are no bundles of lower priority than that of the bundle to be stored, the method proceeds to block 1150, and records that no suitable storage device is available. The portion of the method of FIGS. 11A-11E then continues at block 1110 of FIG. 11A, as described above. If, however, at block 1148, the network node performing the method determines that there is at least one storage device in the fourth set, then the method of FIGS. 11A-11E continues at block 1152.

At block 1152, the method may select, from the storage devices in the fourth set, a storage device on which is stored a minimum set of stored bundles of data that together occupy an amount of storage capacity sufficient to store the received bundle. Then, at block 1154 of FIG. 11E, a determination is made whether a selection of a storage device from the fourth set was made. If, at block 1154, it was determined that no selection of a storage device could be made from the fourth set, the method proceeds to block 1156 of FIG. 11E, and a record is made that no suitable storage device is available, and the portion of the method of FIGS. 11C-11E continues at block 1110 of FIG. 11A, as described above. If, however, at block 1154, it was determined that selection of a storage device could be made from the fourth set then, at block 1158, the network node performing the method of FIGS. 11A-11E may delete/discard the information of the bundles of data in the minimum set of stored bundles determined at block 1152, from the selected storage device of the network node. The method then, at block 1160, deletes the respective bundle context information for the bundles of the minimum set of stored bundles determined at block 1152, from the list(s) in which the bundle context information appears. The portion of the method of FIGS. 11C-11E then passes control to block 1110 of FIG. 11A, as described above.

FIG. 12 is an illustration of an example bundle of data 1200 comprising a portion referred to herein as a bundle header 1210 and a portion referred to herein as bundle data 1215, in accordance with various aspects of the present disclosure. As illustrated in FIG. 12, the bundle data 1215 portion of the bundle of data 1200 may be the entirety of or only a portion of a file 1220. As further illustrated in FIG. 12, the bundle of data 1200 may be communicated using a wired or wireless communication technology within one or more packets including, for example, the packet 1 1230, which may be a packet as described above. The portion of the bundle of data 1200 identified in FIG. 12 as the bundle header 1210 may, for example, comprise bundle context information, as described hereinabove.

Various aspects of the present disclosure may be found in a method of managing storage and dropping of data by a node of a wireless network comprising a plurality of nodes, where each node of the plurality of nodes may comprise one or more storage devices for storing one or more bundles of data, and at least one radio frequency interface for wirelessly receiving and transmitting the bundles of data. Such a method may comprise receiving a bundle of data, by a first node of the plurality of nodes in one or more packets, where the bundle of data may comprise a bundle header portion and a bundle data portion, and where the bundle header portion may comprise bundle context information comprising a bundle priority. The method may also comprise determining, by the first node, whether a copy of the received bundle of data is present in any of the one or more storage devices. The method may further comprise attempting selection, by the first node from the one or more storage devices, of a storage device in which to store the received bundle of data, using the bundle context information; discarding the received bundle of data, if the attempt to select a storage device was not successful; and storing the received bundle of data in the selected storage device, if the attempt to select a storage device was successful.

In accordance with various aspects of the present disclosure, the method may further comprise discarding the received bundle of data, if it is determined that a copy of the received bundle of data is present in any of the one or more storage devices of the first node. Attempting selection of a storage device in which to store the received bundle of data may comprise identifying a first set of storage devices from the one or more storage devices, according to a probability of loss of the bundle of data by the first node; and estimating an amount of time until a next access to the received bundle of data by the first node will occur. Attempting selection of a storage device in which to store the received bundle of data may also comprise identifying, from the first set of storage devices, a second set of storage devices according to the estimated amount of time; and selecting the storage device from the second set of storage devices according to available capacity of the storage devices in the second set and the bundle priority of the received bundle of data.

In accordance with various aspects of the present disclosure, estimating the amount of time until a next access to the received bundle of data by the first node will occur may comprise estimating an amount of time until the first network node will be within wireless communication range of a second node of the plurality of nodes. The bundle context information may comprise any one of the following: an age in the network of the bundle of data, an amount of time until expiration of the bundle of data, and a total number of copies of the bundle of data currently residing within storage of the plurality of nodes of the network. Attempting selection of a storage device in which to store the received bundle of data may also comprise identifying, from the one or more storage devices, a storage device having stored thereon a minimum set of bundles of data that together occupy an amount of storage capacity sufficient to store the received bundle, and that have a bundle priority lower than the bundle priority of the received bundle; and deleting information of the bundles of data of the minimum set of bundles of data from the identified storage device. A method according to aspects of the present disclosure may further comprise adding information about the received bundle of data to one or more lists of information about corresponding bundles of data stored in the one or more storage devices of the first node, if attempting selection of a storage device was successful.

Various aspects of the present disclosure may be observed in a non-transitory computer-readable medium having a plurality of code sections, each code section having stored thereon a plurality of instructions executable by one or more processors. The executable instructions may cause the one or more processors to perform a method of managing storage and dropping of data by a node of a wireless network comprising a plurality of nodes, wherein each node of the plurality of nodes comprises one or more storage devices for storing one or more bundles of data, and at least one radio frequency interface for wirelessly receiving and transmitting the bundles of data. The steps of such a method may be as described above.

Further aspects of the present disclosure may be seen in a system for managing storage and dropping of data by a node of a wireless network comprising a plurality of nodes. Each node of the plurality of nodes in such a system may comprise one or more storage devices for storing one or more bundles of data. Such a system may comprise one or more processors operatively coupled to the storage for storing one or more bundles of data, and to at least one radio frequency interface for wirelessly receiving and transmitting the bundles of data. In such a system, the one or more processors may be operable to, at least, perform the steps of a method such as the method described above.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., flash drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method of managing storage and dropping of data by a node of a wireless network comprising a plurality of nodes, wherein each node of the plurality of nodes comprises one or more storage devices for storing one or more bundles of data, and at least one radio frequency interface for wirelessly receiving and transmitting the bundles of data, the method comprising:
   receiving a bundle of data, by a first node of the plurality of nodes in one or more packets, wherein the bundle of data comprises a bundle header portion and a bundle data portion, and wherein the bundle header portion comprises bundle context information comprising a bundle priority;
   determining, by the first node, whether a copy of the received bundle of data is present in any of the one or more storage devices;
   attempting selection, by the first node from the one or more storage devices, of a storage device in which to store the received bundle of data, using the bundle context information, wherein attempting selection of a storage device in which to store the received bundle of data comprises:
      identifying a first set of storage devices from the one or more storage devices, according to a probability of loss of the bundle of data by the first node,
      estimating an amount of time until a next access to the received bundle of data by the first node will occur,
      identifying, from the first set of storage devices, a second set of storage devices according to the estimated amount of time, and
      selecting the storage device from the second set of storage devices according to available capacity of the storage devices in the second set and the bundle priority of the received bundle of data;
   discarding the received bundle of data, if the attempt to select a storage device was not successful; and
   storing the received bundle of data in the selected storage device, if the attempt to select a storage device was successful.

2. The method according to claim 1, further comprising:
   discarding the received bundle of data, if it is determined that a copy of the received bundle of data is present in any of the one or more storage devices of the first node.

3. The method according to claim 1 wherein estimating the amount of time until a next access to the received bundle of data by the first node will occur comprises estimating an amount of time until the first network node will be within wireless communication range of a second node of the plurality of nodes.

4. The method according to claim 1, wherein the bundle context information comprises any one of the following: an age in the network of the bundle of data, an amount of time until expiration of the bundle of data, and a total number of copies of the bundle of data currently residing within storage of the plurality of nodes of the network.

5. The method according to claim 1, wherein attempting selection of a storage device in which to store the received bundle of data comprises:
   identifying, from the one or more storage devices, a storage device having stored thereon a minimum set of bundles of data that together occupy an amount of storage capacity sufficient to store the received bundle, and that have a bundle priority lower than the bundle priority of the received bundle; and
   deleting information of the bundles of data of the minimum set of bundles of data from the identified storage device.

6. The method according to claim 1, further comprising:
   adding information about the received bundle of data to one or more lists of information about corresponding bundles of data stored in the one or more storage devices of the first node, if attempting selection of a storage device was successful.

7. A non-transitory computer-readable medium having a plurality of code sections, each code section having stored thereon a plurality of instructions executable by one or more processors to cause the one or more processors to perform a method of managing storage and dropping of data by a node of a wireless network comprising a plurality of nodes, wherein each node of the plurality of nodes comprises one or more storage devices for storing one or more bundles of data, and at least one radio frequency interface for wirelessly receiving and transmitting the bundles of data, the steps of the method comprising:
   receiving a bundle of data, by a first node of the plurality of nodes in one or more packets, wherein the bundle of data comprises a bundle header portion and a bundle data portion, and wherein the bundle header portion comprises bundle context information comprising a bundle priority;
   determining, by the first node, whether a copy of the received bundle of data is present in any of the one or more storage devices;
   attempting selection, by the first node from the one or more storage devices, of a storage device in which to store the received bundle of data, using the bundle context information, wherein attempting selection of a storage device in which to store the received bundle of data comprises:
      identifying a first set of storage devices from the one or more storage devices, according to a probability of loss of the bundle of data by the first node,
      estimating an amount of time until a next access to the received bundle of data by the first node will occur,
      identifying, from the first set of storage devices, a second set of storage devices according to the estimated amount of time, and
      selecting the storage device from the second set of storage devices according to available capacity of the storage devices in the second set and the bundle priority of the received bundle of data;
   discarding the received bundle of data, if the attempt to select a storage device was not successful; and
   storing the received bundle of data in the selected storage device, if the attempt to select a storage device was successful.

8. The non-transitory computer-readable medium according to claim 7, the steps of the method further comprising:
   discarding the received bundle of data, if it is determined that a copy of the received bundle of data is present in any of the one or more storage devices of the first node.

9. The non-transitory computer-readable medium according to claim 7, wherein estimating the amount of time until a next access to the received bundle of data by the first node will occur comprises estimating an amount of time until the first network node will be within wireless communication range of a second node of the plurality of nodes.

10. The non-transitory computer-readable medium according to claim 7, wherein the bundle context information comprises any one of the following: an age in the network of the bundle of data, an amount of time until expiration of the bundle of data, and a total number of copies of the bundle of data currently residing within storage of the plurality of nodes of the network.

11. The non-transitory computer-readable medium according to claim 7, wherein attempting selection of a storage device in which to store the received bundle of data comprises:
identifying, from the one or more storage devices, a storage device having stored thereon a minimum set of bundles of data that together occupy an amount of storage capacity sufficient to store the received bundle, and that have a bundle priority lower than the bundle priority of the received bundle; and
deleting information of the bundles of data of the minimum set of bundles of data from the identified storage device.

12. The non-transitory computer-readable medium according to claim 7, the steps of the method further comprising:
adding information about the received bundle of data to one or more lists of information about corresponding bundles of data stored in the one or more storage devices of the first node, if attempting selection of a storage device was successful.

13. A system for managing storage and dropping of data by a node of a wireless network comprising a plurality of nodes, wherein each node of the plurality of nodes comprises one or more storage devices for storing one or more bundles of data, the system comprising:
one or more processors operatively coupled to storage for one or more bundles of data, and at least one radio frequency interface for wirelessly receiving and transmitting the bundles of data, the one or more processors operable to, at least:
receive a bundle of data, by a first node of the plurality of nodes in one or more packets, wherein the bundle of data comprises a bundle header portion and a bundle data portion, and wherein the bundle header portion comprises bundle context information comprising a bundle priority;
determine, by the first node, whether a copy of the received bundle of data is present in any of the one or more storage devices;
attempt selection, by the first node from the one or more storage devices, of a storage device in which to store the received bundle of data, using the bundle context information, wherein to attempt selection of a storage device in which to store the received bundle of data, the one or more processors are operable to:
identify a first set of storage devices from the one or more storage devices, according to a probability of loss of the bundle of data by the first node,
estimate an amount of time until a next access to the received bundle of data by the first node will occur,
identify, from the first set of storage devices, a second set of storage devices according to the estimated amount of time, and
select the storage device from the second set of storage devices according to available capacity of the storage devices in the second set and the bundle priority of the received bundle of data;
discard the received bundle of data, if the attempt to select a storage device was not successful; and
store the received bundle of data in the selected storage device, if the attempt to select a storage device was successful.

14. The system according to claim 13, the one or more processors further operable to, at least:
discard the received bundle of data, if it is determined that a copy of the received bundle of data is present in any of the one or more storage devices of the first node.

15. The system according to claim 13 wherein estimating the amount of time until a next access to the received bundle of data by the first node will occur comprises estimating an amount of time until the first network node will be within wireless communication range of a second node of the plurality of nodes.

16. The system according to claim 13, wherein the bundle context information comprises any one of the following: an age in the network of the bundle of data, an amount of time until expiration of the bundle of data, and a total number of copies of the bundle of data currently residing within storage of the plurality of nodes of the network.

17. The system according to claim 13, wherein attempting selection of a storage device in which to store the received bundle of data comprises:
identifying, from the one or more storage devices, a storage device having stored thereon a minimum set of bundles of data that together occupy an amount of storage capacity sufficient to store the received bundle, and that have a bundle priority lower than the bundle priority of the received bundle; and
deleting information of the bundles of data of the minimum set of bundles of data from the identified storage device.

18. The system according to claim 13, wherein the one or more processors are further operable to, at least:
add information about the received bundle of data to one or more lists of information about corresponding bundles of data stored in the one or more storage devices of the first node, if attempting selection of a storage device was successful.

\* \* \* \* \*